(12) United States Patent
Honda et al.

(10) Patent No.: US 10,082,324 B2
(45) Date of Patent: Sep. 25, 2018

(54) REFRIGERATION APPARATUS HAVING LEAKAGE OR CHARGE DEFICIENCY DETERMINING FEATURE

(71) Applicant: DAIKIN INDUSTRIES, LTD., Osaka-shi, Osaka (JP)

(72) Inventors: Masahiro Honda, Settsu (JP); Shigeki Kamitani, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/561,580

(22) PCT Filed: Mar. 28, 2016

(86) PCT No.: PCT/JP2016/059877
§ 371 (c)(1),
(2) Date: Sep. 26, 2017

(87) PCT Pub. No.: WO2016/158845
PCT Pub. Date: Oct. 6, 2016

(65) Prior Publication Data
US 2018/0080692 A1    Mar. 22, 2018

(30) Foreign Application Priority Data

Mar. 31, 2015    (JP) .................. 2015-071370

(51) Int. Cl.
F25B 45/00    (2006.01)
F25B 49/00    (2006.01)
(Continued)

(52) U.S. Cl.
CPC .............. *F25B 41/04* (2013.01); *F25B 13/00* (2013.01); *F25B 49/022* (2013.01);
(Continued)

(58) Field of Classification Search
CPC ............ F25B 2500/22; F25B 2500/222; F25B 2600/2501; F25B 2700/2101;
(Continued)

(56) References Cited

U.S. PATENT DOCUMENTS 7,946,121 B2 *   5/2011   Yamaguchi ............. F25B 13/00
                                                            62/127
2009/0322544 A1* 12/2009  McDowell ................ F17D 5/06
                                                            340/605

FOREIGN PATENT DOCUMENTS

JP    2008-64456 A    3/2008
JP    2008-196829 A   8/2008
JP    2010-223542 A   10/2010

OTHER PUBLICATIONS

Decision to Grant a Patent of corresponding JP Application No. 2015-071370 dated Jun. 14, 2016.
(Continued)

*Primary Examiner* — Ned Landrum
*Assistant Examiner* — Daniel C Comings
(74) *Attorney, Agent, or Firm* — Global IP Counselors, LLP

(57) ABSTRACT

A refrigeration apparatus includes a primary circuit with a first expansion valve, a bypass circuit extending between branching and joining portions on the refrigerant primary circuit, a heat exchanger, a second expansion valve disposed upstream of the heat exchanger in the bypass circuit, first and second refrigerant flow rate calculating components, and a determining component. The primary circuit also includes a compressor, radiator, and evaporator. The heat exchanger includes first and second refrigerant flow paths disposed on the primary and bypass circuits, respectively, to cause heat between refrigerant flowing in the paths. The first and second refrigerant flow rate calculating components calculate first and second flow rates of refrigerant flowing (Continued)

through the bypass circuit based on refrigeration cycle theory and fluid theory, respectively. The determining component determines whether there is refrigerant leakage or refrigerant charge deficiency based on comparison of the first and second refrigerant flow rates.

20 Claims, 6 Drawing Sheets

(51) Int. Cl.
  *F25B 41/04* (2006.01)
  *F25B 13/00* (2006.01)
  *F25B 49/02* (2006.01)
  *G01F 1/36* (2006.01)
(52) U.S. Cl.
  CPC . *F25B 2500/222* (2013.01); *F25B 2600/2501* (2013.01); *F25B 2700/13* (2013.01); *G01F 1/36* (2013.01); *G01F 1/363* (2013.01); *Y10T 137/0368* (2015.04); *Y10T 137/0452* (2015.04); *Y10T 137/7759* (2015.04)
(58) Field of Classification Search
  CPC ......... Y10T 137/7759; Y10T 137/0368; Y10T 137/0452; G05D 7/0623; G01F 1/36; G01F 1/363
  USPC .......................................................... 62/149
  See application file for complete search history.

(56) References Cited

OTHER PUBLICATIONS

International Preliminary Report of corresponding PCT Application No. PCT/JP2016/059877 dated Oct. 12, 2017.
International Search Report of corresponding PCT Application No. PCT/JP2016/059877 dated Jun. 21, 2016.
European Search Report of corresponding EP Application No. 16 77 2726.2 dated Mar. 22, 2018.

* cited by examiner

REFRIGERATION APPARATUS HAVING LEAKAGE OR CHARGE DEFICIENCY DETERMINING FEATURE

CROSS-REFERENCE TO RELATED APPLICATIONS

This U.S. National stage application claims priority under 35 U.S.C. § 119(a) to Japanese Patent Application No. 2015-071370, filed in Japan on Mar. 31, 2015, the entire contents of which are hereby incorporated herein by reference.

TECHNICAL FIELD

The present invention relates to a refrigeration apparatus.

BACKGROUND ART

Conventionally, refrigeration apparatuses that detect whether or not there is refrigerant leakage or refrigerant charge deficiency have been proposed. For example, in JP-A No. 2008-64456, after installation of the refrigeration apparatus, the quantity of refrigerant in refrigerant connection pipes is calculated on the basis of the capacity of the refrigerant connection pipes and the like, and by adding to this the quantity of refrigerant in other parts, the quantity of refrigerant in the entire refrigerant circuit is calculated. Then, by comparing the calculation result with an optimum refrigerant quantity calculated beforehand by test or simulation, it is determined whether or not there is refrigerant leakage or refrigerant charge deficiency.

SUMMARY

Technical Problem

However, in JP-A No. 2008-64456, for performing the determination of whether or not there is refrigerant leakage or refrigerant charge deficiency, it is necessary to calculate beforehand by test or simulation the optimum refrigerant quantity. For this reason, to actually apply JP-A No. 2008-64456, it is necessary to implement enormous fundamental data acquisition tests for each specification of components such as a heat exchanger. As a result, depending on the case, the number of man hours for development increases and costs increase.

Thus, it is an object of the present invention to provide a refrigeration apparatus that detects whether or not there is refrigerant leakage or refrigerant charge deficiency while restraining costs increasing.

Solution to Problem

A refrigeration apparatus according to a first aspect of the invention is a refrigeration apparatus including a refrigerant primary circuit and a bypass circuit. The refrigerant primary circuit configured and arranged to include a compressor, a refrigerant radiator, a refrigerant evaporator, and an expansion valve. The refrigeration apparatus comprising a heat exchanger, a second expansion valve, a first refrigerant flow rate calculating component, a second refrigerant flow rate calculating component, and a determining component. The bypass circuit configured and arranged to extend between a branching portion and a joining portion. The bypass circuit configured and arranged to cause refrigerant to bypass. The branching portion is disposed on the refrigerant primary circuit. The joining portion is disposed on the refrigerant primary circuit. The heat exchanger configured and arranged to include a first refrigerant flow path and a second refrigerant flow path. The first refrigerant flow path is disposed on the refrigerant primary circuit. The second refrigerant flow path is disposed on the bypass circuit. The heat exchanger configured and arranged to cause the refrigerant flowing through the first refrigerant flow path and the refrigerant flowing through the second refrigerant flow path to exchange heat. The second expansion valve is disposed on an upstream side of the heat exchanger in the bypass circuit. The second expansion valve configured and arranged to reduce the pressure of the refrigerant. The first refrigerant flow rate calculating component configured and arranged to calculate, as a first refrigerant flow rate on the basis of refrigeration cycle theory, the flow rate of the refrigerant flowing through the bypass circuit. The second refrigerant flow rate calculating component configured and arranged to calculate, as a second refrigerant flow rate on the basis of fluid theory, the flow rate of the refrigerant flowing through the bypass circuit. The determining component configured and arranged to determine whether or not there is refrigerant leakage or refrigerant charge deficiency on the basis of a result of a comparison of the first refrigerant flow rate calculated by the first refrigerant flow rate calculating component and the second refrigerant flow rate calculated by the second refrigerant flow rate calculating component.

In the refrigeration apparatus according to the first aspect of the invention, the first refrigerant flow rate calculating component calculates, as the first refrigerant flow rate on the basis of refrigeration cycle theory, the flow rate of the refrigerant flowing through the bypass circuit, the second refrigerant flow rate calculating component calculates, as the second refrigerant flow rate on the basis of fluid theory, the flow rate of the refrigerant flowing through the bypass circuit. Also, the determining component determines whether or not there is refrigerant leakage or refrigerant charge deficiency on the basis of the result of the comparison of the first refrigerant flow rate and the second refrigerant flow rate that have been calculated. Because of this, the flow rate of the refrigerant flowing through the bypass circuit is calculated as the first refrigerant flow rate based on refrigeration cycle theory and is calculated as the second refrigerant flow rate based on fluid theory, and whether or not there is refrigerant leakage or refrigerant charge deficiency is determined by the comparison of the first refrigerant flow rate and the second refrigerant flow rate. As a result, it becomes possible to perform the determination of whether or not there is refrigerant leakage or refrigerant charge deficiency without requiring the time and effort of calculating beforehand by test or simulation the optimum refrigerant quantity. Accordingly, in actual applying for the refrigeration apparatus, the number of man hours for development is restrained from increasing.

Furthermore, by comparing the first refrigerant flow rate and the second refrigerant flow rate, when refrigerant leakage or refrigerant charge deficiency is occurring, it also becomes possible to determine the extent of the leakage or deficiency.

Therefore, it becomes possible to determine with high precision whether or not there is refrigerant leakage or refrigerant charge deficiency while restraining costs increasing.

It should be noted that the bypass circuit extends between the branching portion and the joining portion in the refrigerant primary circuit and causes the refrigerant to bypass. The words "extends between the branching portion and the joining portion" here means, for example, "extends from the high-pressure side to the low-pressure side of the refrigerant primary circuit" or means, for example, "extends from the high-pressure side to the intermediate-pressure side of the refrigerant primary circuit."

Also, "refrigeration cycle theory" here is theory that calculates the quantity of refrigerant circulating in a refrigerant circuit on the basis of the enthalpy of the refrigerant. Furthermore, "fluid theory" means theory that calculates the quantity of refrigerant circulating in a refrigerant circuit on the basis of the pressure of the refrigerant.

A refrigeration apparatus according to a second aspect of the invention is the refrigeration apparatus according to the first aspect, further comprising a first sensor, a second sensor, and a third sensor. The first sensor is disposed on an upstream side of the branching portion. The first sensor is a sensor used for measuring the enthalpy of the refrigerant flowing into the branching portion. The second sensor is disposed on a downstream side of the first refrigerant flow path. The second sensor is a sensor used for measuring the enthalpy of the refrigerant flowing out from the first refrigerant flow path. The third sensor is disposed on a downstream side of the second refrigerant flow path. The third sensor is a sensor used for measuring the enthalpy of the refrigerant flowing out from the second refrigerant flow path.

Because of this, it becomes possible to calculate the first refrigerant flow rate with a simple configuration. As a result, costs can be further restrained from increasing.

A refrigeration apparatus according to a third aspect of the invention is the refrigeration apparatus according to the second aspect, wherein the first refrigerant flow rate calculating component configured and arranged to calculate the first refrigerant flow rate on the basis of the measurement value of the first sensor, the measurement value of the second sensor, the measurement value of the third sensor, and a refrigerant circulation quantity.

Because of this, the first refrigerant flow rate is calculated with high precision. As a result, it becomes possible to perform the determination with even higher precision. It should be noted that "refrigerant circulation quantity" here is a value determined by means of a known method from the characteristics of the compressor and/or the like.

A refrigeration apparatus according to a fourth aspect of the invention is the refrigeration apparatus according to any of the first aspect to the third aspect, further comprising a fourth sensor and a fifth sensor. The fourth sensor is disposed on an upstream side of the branching portion. The fourth sensor is a sensor used for measuring a corresponding saturated pressure of the refrigerant flowing into the branching portion. The fifth sensor is disposed on a suction side of the compressor. The fifth sensor is a sensor used for measuring the refrigerant pressure on the suction side of the compressor.

Because of this, it becomes possible to calculate the second refrigerant flow rate with a simple configuration. As a result, costs are further restrained from increasing.

A refrigeration apparatus according to a fifth aspect of the invention is the refrigeration apparatus according to the fourth aspect, wherein the second refrigerant flow rate calculating component configured and arranged to calculate the second refrigerant flow rate on the basis of the measurement value of the fourth sensor, the measurement value of the fifth sensor, the opening degree of the second expansion valve, and a corresponding saturated liquid density of the refrigerant flowing into the branching portion.

Because of this, the second refrigerant flow rate is calculated with high precision. As a result, it becomes possible to perform the determination with even higher precision.

A refrigeration apparatus according to a sixth aspect of the invention is the refrigeration apparatus according to the second aspect or the third aspect, wherein the first sensor is a temperature sensor configured and arranged to detect the temperature of the refrigerant flowing into the branching portion. The second sensor is a temperature sensor configured and arranged to detect the temperature of the refrigerant flowing out from the first refrigerant flow path. The third sensor is a temperature sensor configured and arranged to detect the temperature of the refrigerant flowing out from the second refrigerant flow path.

Because of this, it becomes possible to calculate the first refrigerant flow rate with an even simpler configuration. As a result, costs are further restrained from increasing.

A refrigeration apparatus according to a seventh aspect of the invention is the refrigeration apparatus according to any of the first aspect to the sixth aspect, wherein the determining component configured and arranged to determine whether or not there is refrigerant leakage or refrigerant charge deficiency on the basis of a result of a comparison of a value obtained by dividing the second refrigerant flow rate by the first refrigerant flow rate and a predetermined first threshold value.

Because of this, it becomes possible to perform the determination with high precision by means of simple computation.

A refrigeration apparatus according to an eighth aspect of the invention is the refrigeration apparatus according to any of the first aspect to the seventh aspect, further comprising a control component. The control component configured and arranged to control the operations of the compressor, the expansion valve, and the second expansion valve. The control component configured and arranged to fix the operating states of the compressor, the expansion valve, and the second expansion valve when the first refrigerant flow rate calculating component or the second refrigerant flow rate calculating component calculates the first refrigerant flow rate or the second refrigerant flow rate.

Because of this, the first refrigerant flow rate or the second refrigerant flow rate is stably and precisely calculated. Accordingly, it becomes possible to perform the determination with even higher precision.

A refrigeration apparatus according to a ninth aspect of the invention is the refrigeration apparatus according to any of the first aspect to the eighth aspect, wherein the determining component configured and arranged to determine whether or not there is refrigerant leakage or refrigerant charge deficiency in a case where an outside air temperature and an indoor temperature meet a predetermined temperature condition.

Because of this, the first refrigerant flow rate or the second refrigerant flow rate is stably and precisely calculated. Accordingly, it becomes possible to perform the determination with even higher precision.

Advantageous Effects of Invention

In the refrigeration apparatus according to the first aspect of the invention, the flow rate of the refrigerant flowing through the bypass circuit is calculated as the first refrigerant flow rate based on refrigeration cycle theory and is calculated as the second refrigerant flow rate based on fluid theory. Also, whether or not there is refrigerant leakage or refrigerant charge deficiency is determined by the comparison of the first refrigerant flow rate and the second refrigerant flow rate. As a result, it becomes possible to perform the determination of whether or not there is refrigerant leakage or refrigerant charge deficiency without requiring the time and effort of calculating beforehand by test or simulation the optimum refrigerant quantity. Accordingly, in actual applying for the refrigeration apparatus, the number of man hours for development is restrained from increasing. Furthermore, by comparing the first refrigerant flow rate and the second refrigerant flow rate, when refrigerant leakage or refrigerant charge deficiency is occurring, it also becomes possible to determine the extent of the leakage or deficiency. Therefore, it becomes possible to determine with high precision whether or not there is refrigerant leakage or refrigerant charge deficiency while restraining costs increasing.

In the refrigeration apparatus according to the second aspect of the invention, it becomes possible to calculate the first refrigerant flow rate with a simple configuration. As a result, costs are further restrained from increasing.

In the refrigeration apparatus according to the third aspect of the invention, the first refrigerant flow rate is calculated with high precision. As a result, it becomes possible to perform the determination with even higher precision.

In the refrigeration apparatus according to the fourth aspect of the invention, it becomes possible to calculate the second refrigerant flow rate with a simple configuration. As a result, costs are further restrained from increasing.

In the refrigeration apparatus according to the fifth aspect of the invention, the second refrigerant flow rate is calculated with high precision. As a result, it becomes possible to perform the determination with even higher precision.

In the refrigeration apparatus according to the sixth aspect of the invention, it becomes possible to calculate the first refrigerant flow rate with an even simpler configuration. As a result, costs are further restrained from increasing.

In the refrigeration apparatus according to the seventh aspect of the invention, it becomes possible to perform the determination with high precision by means of simple computation.

In the refrigeration apparatus according to the eighth aspect or the ninth aspect of the invention, it becomes possible to perform the determination with even higher precision.

DESCRIPTION OF EMBODIMENT

An air conditioning system 100 according to an embodiment of the invention will be described below with reference to the drawings. It should be noted that the following embodiment is a specific example of the invention, is not intended to limit the technical scope of the invention, and can be appropriately changed in a range that does not depart from the spirit of the invention.

(1) Air Conditioning System 100

Figure 1:
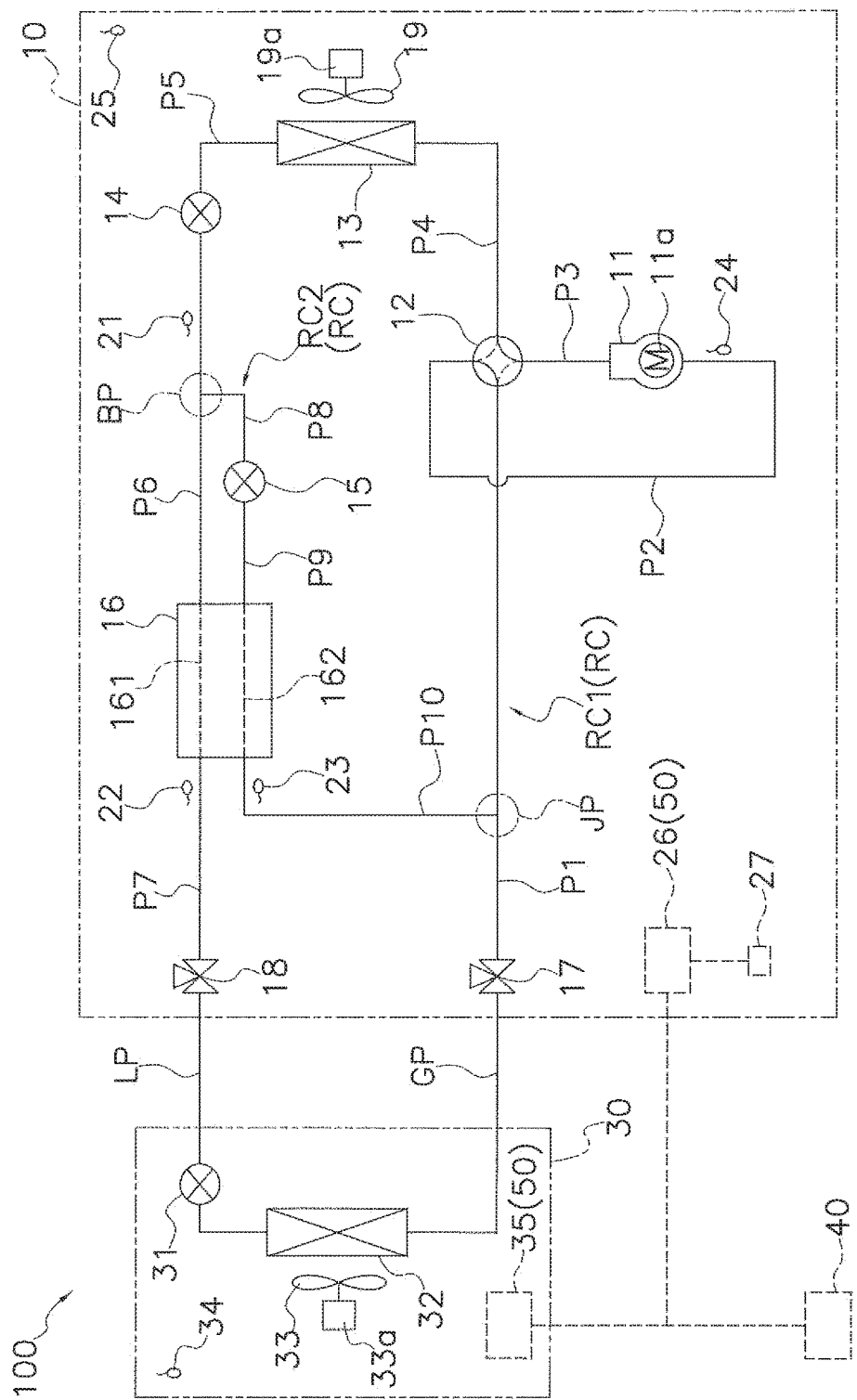
FIG. 1 is an overall configuration diagram of an air conditioning system according to an embodiment of the invention.

FIG. 1 is an overall configuration diagram of the air conditioning system 100 according to the embodiment of the invention.

The air conditioning system 100 is installed in a multi-storied building or a factory, for example, and realizes air conditioning of a target space. The air conditioning system 100 is a refrigerant pipe type air conditioning system and performs cooling and heating of the target space by performing a vapor compression refrigeration cycle.

The air conditioning system 100 is mainly equipped with an outdoor unit 10 serving as a heat source unit, an indoor unit 30 serving as a utilization unit, and a remote controller 40 serving as an input device and display device.

In the air conditioning system 100, a refrigerant circuit RC is configured as a result of the outdoor unit 10 and the indoor unit 30 being interconnected by a liquid connection pipe LP and a gas connection pipe GP. In the air conditioning system 100, a refrigeration cycle is performed wherein refrigerant contained in the refrigerant circuit RC is compressed, cooled or condensed, reduced in pressure, heated or evaporated, and thereafter again compressed. In the air conditioning system 100, R32, which has a higher specific gravity than air, is used as the refrigerant.

The air conditioning system 100 has, as operating modes, a cooling mode in which it performs a cooling operation, a heating mode in which it performs a heating operation, and a refrigerant quantity determination mode in which it performs a refrigerant quantity determination operation. The switching of the operating modes in the air conditioning system 100 is controlled by a later-described controller 50.

(1-1) Outdoor Unit 10

The outdoor unit 10 is installed outdoors, such as on a roof or in a basement. The outdoor unit 10 mainly has, as circuit elements of the refrigerant circuit RC, a compressor 11, a four-way switching valve 12, an outdoor heat exchanger 13 (which corresponds to a "radiator" in the claims), a first outdoor expansion valve 14 (which corresponds to an "expansion valve" in the claims), a second outdoor expansion valve 15 (which corresponds to a "second expansion valve" in the claims), a subcooling heat exchanger 16 (which corresponds to a "heat exchanger" in the claims), a gas-side stop valve 17, and a liquid-side stop valve 18. Also, the outdoor unit 10 has plural refrigerant pipes (a first pipe P1 to a tenth pipe P10) that interconnect these circuit elements. Furthermore, the outdoor unit 10 has an outdoor fan 19 that generates an air flow that exchanges heat with the refrigerant in the refrigerant circuit RC.

Furthermore, the outdoor unit 10 has, as sensors for obtaining information needed for each type of operation, a first refrigerant temperature sensor 21 (which corresponds to a "first sensor" and a "fourth sensor" in the claims), a second refrigerant temperature sensor 22 (which corresponds to a "second sensor" in the claims), a third refrigerant temperature sensor 23 (which corresponds to a "third sensor" in the claims), a refrigerant pressure sensor 24 (which corresponds to a "fifth sensor" in the claims), and an outdoor air temperature sensor 25.

Furthermore, the outdoor unit 10 has an outdoor unit control component 26 that individually controls the operations of each actuator in the outdoor unit 10.

(1-1-1) Refrigerant Pipes in Outdoor Unit 10

The first pipe P1 has one end connected to one end of the gas-side stop valve 17 and has another end connected to the four-way switching valve 12.

The second pipe P2 has one end connected to the four-way switching valve 12 and has another end connected to a suction port of the compressor 11. The second pipe P2 corresponds to a suction pipe of the compressor 11. The refrigerant pressure sensor 24, which detects a pressure Pe of the refrigerant traveling through the second pipe P2 (i.e., the refrigerant sucked into the compressor 11), is connected via a small tube to the second pipe P2.

The third pipe P3 has one end connected to a discharge port of the compressor 11 and has another end connected to the four-way switching valve 12. The third pipe P3 corresponds to a discharge pipe of the compressor 11.

The fourth pipe P4 has one end connected to the four-way switching valve 12 and has another end connected to the outdoor heat exchanger 13.

The fifth pipe P5 has one end connected to the outdoor heat exchanger 13 and has another end connected to the first outdoor expansion valve 14.

The sixth pipe P6 has one end connected to the first outdoor expansion valve 14 and has another end connected to a first flow path 161 (described later) of the subcooling heat exchanger 16. The first refrigerant temperature sensor 21, which detects a temperature $T_L$ of the refrigerant traveling through the sixth pipe P6 (i.e., the refrigerant flowing into a later-described branching portion BP), is thermally connected to the sixth pipe P6.

The seventh pipe P7 has one end connected to the first flow path 161 of the subcooling heat exchanger 16 and has another end connected to the liquid-side stop valve 18. The second refrigerant temperature sensor 22, which detects a temperature Tsc of the refrigerant in the seventh pipe P7 (i.e., the refrigerant flowing out from the first flow path 161), is thermally connected to the seventh pipe P7.

The eighth pipe P8 has one end connected between both ends of the sixth pipe P6 (the branching portion BP) and has another end connected to the second outdoor expansion valve 15.

The ninth pipe P9 has one end connected to the second outdoor expansion valve 15 and has another end connected to a second flow path 162 (described later) of the subcooling heat exchanger 16.

The tenth pipe P10 has one end connected to the second flow path 162 of the subcooling heat exchanger 16 and has another end connected between both ends of the first pipe P1 (a joining portion JP). The third refrigerant temperature sensor 23, which detects a temperature Tsh of the refrigerant in the tenth pipe P10 (i.e., the refrigerant flowing out from the second flow path 162), is thermally connected to the tenth pipe P10.

(1-1-2) Refrigerant Circuit in Outdoor Unit 10

In the outdoor unit 10, a refrigerant primary circuit RC1 and a bypass circuit RC2 that are part of the refrigerant circuit RC are configured.

The refrigerant primary circuit RC1 includes the compressor 11, the four-way switching valve 12, the outdoor heat exchanger 13, the first outdoor expansion valve 14, the subcooling heat exchanger 16 (the first flow path 161), the gas-side stop valve 17, and the liquid-side stop valve 18. The refrigerant primary circuit RC1 is configured as a result of these being interconnected by refrigerant pipes (the first pipe P1 to the seventh pipe P7). The branching portion BP and the joining portion JP are provided on the refrigerant primary circuit RC1 (see the long dashed short dashed sections in FIG. 1).

The branching portion BP is a section connected to one end of the bypass circuit RC2 (the eighth pipe P8). The branching portion BP is disposed on the refrigerant flow path between the first outdoor expansion valve 14 and the subcooling heat exchanger 16 (i.e., the sixth pipe P6).

The joining portion JP is a section connected to the other end of the bypass circuit RC2 (the tenth pipe P10). The joining portion JP is disposed on the refrigerant flow path (i.e., the first pipe P1) between the gas-side stop valve 17 and the four-way switching valve 12.

The bypass circuit RC2 includes the second outdoor expansion valve 15 and the subcooling heat exchanger 16 (the second flow path 162), and is configured as a result of these being interconnected by refrigerant pipes (the eighth pipe P8 to the tenth pipe P10). The bypass circuit RC2 branches from part (the branching portion BP) of the refrigerant primary circuit RC1 and extends toward another part (the joining portion JP) of the refrigerant primary circuit RC1. In other words, the bypass circuit RC2 branches and extends from the sixth pipe P6 (i.e., the refrigerant flow path between the first outdoor expansion valve 14 and the subcooling heat exchanger 16) and is connected to the first pipe P1 (i.e., the refrigerant flow path on the suction side of the compressor 11). That is, the bypass circuit RC2 is a circuit for causing the refrigerant to bypass from the refrigerant flow path on the high-pressure side of the refrigerant primary circuit RC1 to the refrigerant flow path on the low-pressure side of the refrigerant primary circuit RC1.

(1-1-3) Circuit Elements in Outdoor Unit 10

The compressor 11 is a mechanism that sucks in and compresses low-pressure gas refrigerant and then discharges the compressed refrigerant. The compressor 11 has a closed structure with a built-in compressor motor 11a. In the compressor 11, a rotary-type or scroll-type compression element (not shown in the drawings) housed inside a casing (not shown in the drawings) is driven using the compressor motor 11a as a drive source. During operation, the compressor motor 11a is inverter controlled by the outdoor unit control component 26. Rotational speed of the compressor motor 11a is adjusted in accordance with the situation by the outdoor unit control component 26. That is, the compressor 11 is capacity-variable. When driven, the compressor 11 sucks in low-pressure refrigerant from the second pipe P2 (suction pipe), compresses the refrigerant into high-pressure gas refrigerant, and then discharges the high-pressure gas refrigerant to the third pipe P3 (discharge pipe).

The four-way switching valve 12 is a flow path switching valve for switching the direction in which the refrigerant flows in accordance with the operating situation. The four-way switching valve 12 has its refrigerant flow paths switched as a result being supplied with a drive voltage. Specifically, the four-way switching valve 12 is switched between a first state (see the solid lines of the four-way switching valve 12 in FIG. 1) and a second state (see the dashed lines of the four-way switching valve 12 in FIG. 1). In the first state, the four-way switching valve 12 interconnects the first pipe P1 and the second pipe P2 and also interconnects the third pipe P3 and the fourth pipe P4. In the second state, the four-way switching valve 12 interconnects the first pipe P1 and the third pipe P3 and also interconnects the second pipe P2 and the fourth pipe P4.

The outdoor heat exchanger 13 is a heat exchanger that functions as a refrigerant condenser (radiator) in the cooling mode (cooling operation) and functions as a refrigerant evaporator in the heating mode (heating operation). The outdoor heat exchanger 13 is, for example, a cross fin tube type or stacked type heat exchanger, and includes plural heat transfer tubes and plural fins (not shown in the drawings). The gas side of the outdoor heat exchanger 13 is connected to the fourth pipe P4, and the liquid side of the outdoor heat exchanger 13 is connected to the fifth pipe P5.

The first outdoor expansion valve 14 and the second outdoor expansion valve 15 are electrically powered valves whose opening degrees change as a result of the valves being supplied with a drive voltage. The first outdoor expansion valve 14 and the second outdoor expansion valve 15 reduce the pressure of the inflowing refrigerant in accordance with their opening degrees. The first outdoor expansion valve 14 and the second outdoor expansion valve 15 have their opening degrees individually adjusted in accordance with the operating situation by the outdoor unit control component 26.

The first outdoor expansion valve 14 is disposed between the outdoor heat exchanger 13 and the subcooling heat exchanger 16 in the refrigerant primary circuit RC1. More specifically, the first outdoor expansion valve 14 is disposed on the outdoor heat exchanger 13 side (i.e., the upstream side in a case where the four-way switching valve 12 is in the first state) from the branching portion BP (i.e., the starting point of the bypass circuit RC2).

The second outdoor expansion valve 15 is disposed between the branching portion BP (i.e., the starting point of the bypass circuit RC) and the subcooling heat exchanger 16 in the bypass circuit RC2. That is, the second outdoor expansion valve 15 is disposed on the downstream side from the branching portion BP (i.e., the starting point of the bypass circuit RC2) and on the upstream side from the subcooling heat exchanger 16 in a case where the four-way switching valve 12 is in the first state.

The subcooling heat exchanger 16 is a heat exchanger for subcooling the high-pressure liquid refrigerant that has traveled through the outdoor heat exchanger 13 in the cooling mode. The subcooling heat exchanger 16 is, for example, a double-pipe heat exchanger. The subcooling heat exchanger 16 includes the first flow path 161 (which corresponds to a "first refrigerant flow path" in the claims) and the second flow path 162 (which corresponds to a "second refrigerant flow path" in the claims). The subcooling heat exchanger 16 has a structure wherein the refrigerant flowing through the first flow path 161 and the refrigerant flowing through the second flow path 162 can exchange heat with each other. The first flow path 161 is disposed between the sixth pipe P6 and the seventh pipe P7. That is, the first flow path 161 is disposed on the refrigerant primary circuit RC1. The second flow path 162 is disposed between the ninth pipe P9 and the tenth pipe P10. That is, the second flow path 162 is disposed on the bypass circuit RC2.

The gas-side stop valve 17 and the liquid-side stop valve 18 are manually operated valves that are opened and closed when charging with refrigerant and during pump down. The gas-side stop valve 17 has one end connected to the gas connection pipe GP and has another end connected to the first pipe P1. The liquid-side stop valve 18 has one end connected to the liquid connection pipe LP and has another end connected to the seventh pipe P7.

(1-1-4) Outdoor Fan 19

The outdoor fan 19 is a fan that generates an air flow that flows into the outdoor unit 10 from the outside, travels through the outdoor heat exchanger 13, and then flows out to the outside of the outdoor unit 10. The outdoor fan 19 is, for example, a propeller fan. The outdoor fan 19 is driven in conjunction with an outdoor fan motor 19a. The outdoor fan motor 19a (i.e., the outdoor fan 19) has its rotational speed appropriately adjusted by the outdoor unit control component 26.

(1-1-5) Sensors in Outdoor Unit 10

The first refrigerant temperature sensor 21, the second refrigerant temperature sensor 22, and the third refrigerant temperature sensor 23 detect the temperature of the refrigerant traveling through predetermined sections of the refrigerant circuit RC. The first refrigerant temperature sensor 21, the second refrigerant temperature sensor 22, and the third refrigerant temperature sensor 23 are common general-purpose articles, and are configured by thermistors, thermocouples and/or the like.

The first refrigerant temperature sensor 21 is thermally connected to the sixth pipe P6. That is, the first refrigerant temperature sensor 21 is disposed on the upstream side from the branching portion BP (i.e., the upstream side of the first flow path 161 and the second flow path 162) in a case where the four-way switching valve 12 is in the first state. The first refrigerant temperature sensor 21 detects the temperature $T_L$ of the refrigerant traveling through the sixth pipe P6 (i.e., the refrigerant flowing into the branching portion BP). The detection value of the first refrigerant temperature sensor 21 is used when the later-described controller 50 finds an enthalpy $h(T_L)$ of the refrigerant traveling through the sixth pipe P6. That is, the first refrigerant temperature sensor 21 is a sensor for measuring the enthalpy of the refrigerant traveling through the sixth pipe P6 (the refrigerant flowing into the branching portion BP). Furthermore, the detection value of the first refrigerant temperature sensor 21 is used when the controller 50 finds a corresponding saturated pressure value $P(T_L)$ of the refrigerant traveling through the sixth pipe P6. That is, the first refrigerant temperature sensor 21 is a sensor for measuring the corresponding saturated pressure of the refrigerant traveling through the sixth pipe P6 (the refrigerant flowing into the branching portion BP).

The second refrigerant temperature sensor 22 is thermally connected to the seventh pipe P7. That is, the second refrigerant temperature sensor 22 is disposed on the downstream side from the first flow path 161 in a case where the four-way switching valve 12 is in the first state. The second refrigerant temperature sensor 22 detects the temperature Tsc of the refrigerant traveling through the seventh pipe P7 (i.e., the refrigerant flowing out from the first flow path 161). The detection value of the second refrigerant temperature sensor 22 is used when the later-described controller 50 finds an enthalpy h(Tsc) of the refrigerant traveling through the seventh pipe P7. That is, the second refrigerant temperature sensor 22 is a sensor for measuring the enthalpy of the refrigerant traveling through the seventh pipe P7 (i.e., the refrigerant flowing out from the first flow path 161).

The third refrigerant temperature sensor 23 is thermally connected to the tenth pipe P10. That is, the third refrigerant temperature sensor 23 is disposed on the downstream side from the second flow path 162 in a case where the four-way switching valve 12 is in the first state. The third refrigerant temperature sensor 23 detects the temperature Tsh of the refrigerant traveling through the tenth pipe P10 (i.e., the refrigerant flowing out from the second flow path 162). The detection value of the third refrigerant temperature sensor 23 is used when the later-described controller 50 finds an enthalpy h(Tsh) of the refrigerant traveling through the tenth pipe P10. That is, the third refrigerant temperature sensor 23 is a sensor for measuring the enthalpy of the refrigerant traveling through the tenth pipe P10 (i.e., the refrigerant flowing out from the second flow path 162).

The refrigerant pressure sensor 24 detects the pressure Pe of the refrigerant traveling through the second pipe P2 (the suction pipe of the compressor 11). The refrigerant pressure sensor 24 is connected to the second pipe P2 via a small tube. That is, the refrigerant pressure sensor 24 is disposed on the suction side of the compressor 11. A common general-purpose article is employed as the refrigerant pressure sensor 24.

The outdoor air temperature sensor 25 detects an outdoor air temperature To. The outdoor air temperature sensor 25 is, for example, configured by a thermistor or the like. The outdoor air temperature sensor 25 is disposed, for example, in the neighborhood of an air inlet (not shown in the drawings) of the outdoor unit 10.

(1-1-6) Outdoor Unit Control Component 26

The outdoor unit control component 26 is a functional component that controls the operations of actuators included in the outdoor unit 10. The outdoor unit control component 26 includes a microcomputer configured by a CPU, a memory and the like. The outdoor unit control component 26 is connected via a communication line to, and sends signals to and receives signals from, an indoor unit control component 35 (described later). Furthermore, the outdoor unit control component 26 is electrically connected to the first refrigerant temperature sensor 21, the second refrigerant temperature sensor 22, the third refrigerant temperature sensor 23, the refrigerant pressure sensor 24, and the outdoor air temperature sensor 25, and signals corresponding to the detection values of the sensors are individually output from the sensors to the outdoor unit control component 26 at a predetermined timing. Furthermore, the outdoor unit control component 26 is electrically connected to an input switch 27 that receives an instruction to start the refrigerant quantity determination operation.

(1-2) Indoor Unit 30

The indoor unit 30 is installed indoors. The indoor unit 30 is, for example, ceiling-hung, ceiling-secured, or wall-mounted. The indoor unit 30 mainly has an indoor expansion valve 31, an indoor heat exchanger 32 (which corresponds to an "evaporator" in the claims), an indoor fan 33, an indoor temperature sensor 34, and an indoor unit control component 35.

The indoor expansion valve 31 is an electrically powered valve whose opening degree changes as a result of being supplied with a drive voltage. The indoor expansion valve 31 reduces the pressure of the inflowing refrigerant in accordance with its opening degree. The indoor expansion valve 31 has its opening degree appropriately adjusted in accordance with the operating situation by the indoor unit control component 35. One end of the indoor expansion valve 31 is connected to the liquid connection pipe LP, and the other end is connected to a refrigerant pipe extending to the indoor heat exchanger 32.

The indoor heat exchanger 32 is a heat exchanger that functions as a refrigerant evaporator in the cooling mode (cooling operation) and functions as a refrigerant condenser in the heating mode (heating operation). The indoor heat exchanger 32 is, for example, a cross fin tube type, stacked type heat exchanger or the like. The indoor heat exchanger 32 has plural heat transfer tubes (not shown in the drawings) and plural fins (not shown in the drawings). The liquid side of the indoor heat exchanger 32 is connected to the refrigerant pipe extending to the indoor expansion valve 31, and the gas side of the indoor heat exchanger 32 is connected to the gas connection pipe GP.

The indoor fan 33 is a fan that generates an air flow that flows into the indoor unit 30 from the outside, travels through the indoor heat exchanger 32, and flows out to the outside of the indoor unit 30. The indoor fan 33 is, for example, a propeller fan, a cross-flow fan or the like. The indoor fan 33 is driven in conjunction with an indoor fan motor 33a. During operation, the indoor fan motor 33a has its rotational speed appropriately adjusted by the indoor unit control component 35.

The indoor temperature sensor 34 detects an indoor temperature Ti. The indoor temperature sensor 34 is configured by a thermistor, for example. The indoor temperature sensor 34 is disposed, for example, in the neighborhood of an air inlet (not shown in the drawings) of the indoor unit 30.

The indoor unit control component 35 is a functional component that controls the operations of actuators included in the indoor unit 30. The indoor unit control component 35 includes a microcomputer configured by a CPU, a memory and the like. The indoor unit control component 35 is connected via a communication line to, and sends signals to and receives signals from, the outdoor unit control component 26. Also, the indoor unit control component 35 sends signals to and receives signals from the remote controller 40 via a communication line or a wireless network. Furthermore, the indoor unit control component 35 is electrically connected to the indoor temperature sensor 34, and the detection value is appropriately output from the indoor temperature sensor 34 to the indoor unit control component 35.

(1-3) Remote Controller 40

The remote controller 40 is an input device for being input by the user various types of instructions for switching the operating state of the air conditioning system 100. Also, the remote controller 40 also functions as a display device for displaying the operating state of the air conditioning system 100. Furthermore, the remote controller 40 has a built-in speaker and appropriately outputs predetermined audio. The remote controller 40 sends signals to and receives signals from the indoor unit control component 35 via a communication line or a wireless network.

(2) Flow of Refrigerant in Refrigerant Circuit RC

Figure 2:
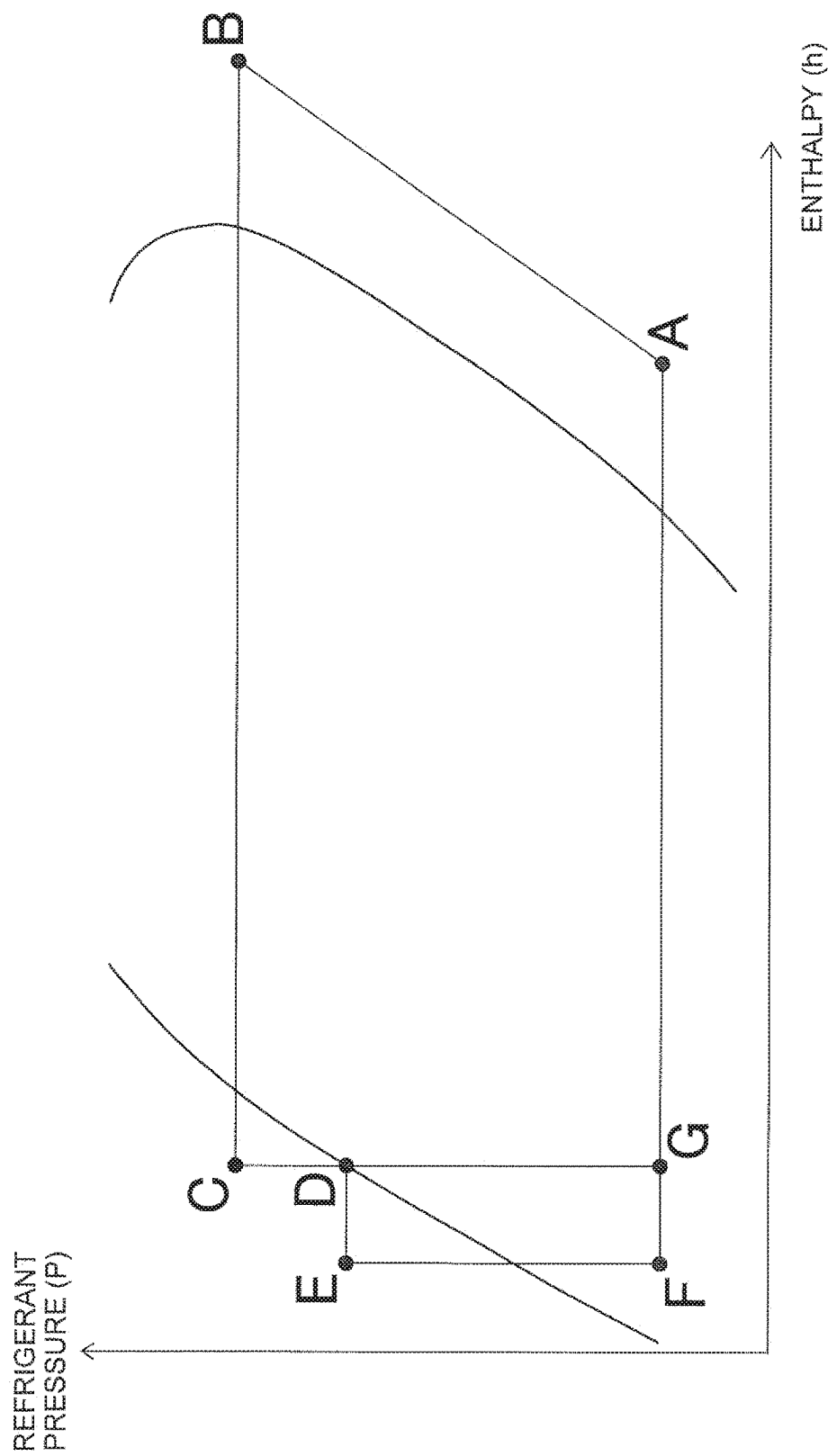
FIG. 2 is a Mollier diagram showing a refrigeration cycle when the air conditioning system is operating.

The flow of the refrigerant in the refrigerant circuit RC in each operating mode will be described below. FIG. 2 is a Mollier diagram showing the refrigeration cycle in the cooling operation or in the refrigerant quantity determination operation of the air conditioning system 100.

(2-1) Flow of Refrigerant in Cooling Mode

In the cooling mode, the four-way switching valve 12 is controlled to the first state (the state indicated by the solid lines of the four-way switching valve 12 in FIG. 1). The first outdoor expansion valve 14 is controlled to its maximum opening degree. The second outdoor expansion valve 15 has its opening degree appropriately adjusted in accordance with the subcooled degree of the refrigerant flowing through the refrigerant primary circuit RC1. The indoor expansion valve 31 has its opening degree appropriately adjusted.

When the compressor 11, the outdoor fan 19, and the indoor fan 33 are driven in this state, the refrigerant is sucked via the second pipe P2 (suction pipe) into the compressor 11, is compressed, and becomes high-pressure gas refrigerant (see A-B in FIG. 2). The high-pressure gas refrigerant that has been discharged from the compressor 11 flows via the third pipe P3 (discharge pipe), the four-way switching valve 12, and the fourth pipe P4 into the outdoor heat exchanger 13 and condenses (see B-C in FIG. 2). The refrigerant that has traveled through the outdoor heat exchanger 13 travels through the fifth pipe P5 and the first outdoor expansion valve 14 and flows into the sixth pipe P6.

The refrigerant that has flowed into the sixth pipe P6 branches in two directions at the branching portion BP when it flows through the sixth pipe P6.

The refrigerant following one direction out of the two directions in which the refrigerant has branched flows into the eighth pipe P8 (i.e., the bypass circuit RC2). The refrigerant that has traveled through the eighth pipe P8 flows into the second outdoor expansion valve 15 and has its pressure reduced in accordance with the opening degree of the second outdoor expansion valve 15 (see D-G in FIG. 2). The refrigerant that has traveled through the second outdoor expansion valve 15 travels via the ninth pipe P9 through the second flow path 162 of the subcooling heat exchanger 16. The refrigerant traveling through the second flow path 162 exchanges heat with the refrigerant traveling through the first flow path 161. The refrigerant that has traveled through the second flow path 162 reaches the joining portion JP via the tenth pipe P10, flows into the first pipe P1 (i.e., the refrigerant primary circuit RC1), and joins the refrigerant flowing through the first pipe P1.

The refrigerant following the other direction out of the two directions in which the refrigerant has branched flows into the first flow path 161 of the subcooling heat exchanger 16. The refrigerant traveling through the first flow path 161 becomes subcooled as a result of exchanging heat with the refrigerant traveling through the second flow path 162 (see D-E in FIG. 2). The refrigerant that has traveled through the second flow path 162 flows via the liquid-side stop valve 18 and the liquid connection pipe LP into the indoor expansion valve 31.

The refrigerant that has flowed into the indoor expansion valve 31 has its pressure reduced in accordance with the opening degree of the indoor expansion valve 31 (see E-F in FIG. 2). The refrigerant that has traveled through the indoor expansion valve 31 flows into the indoor heat exchanger 32 and evaporates (see F-A in FIG. 2). The refrigerant that has traveled through the indoor heat exchanger 32 is sucked back into the compressor 11 via the gas connection pipe GP, the gas-side stop valve 17, the first pipe P1, the four-way switching valve 12, and the second pipe P2.

(2-2) Flow of Refrigerant in Heating Mode

In the heating mode, the four-way switching valve 12 is controlled to the second state (the state indicated by the dashed lines of the four-way switching valve 12 in FIG. 1). The first outdoor expansion valve 14 has its opening degree appropriately adjusted. The second outdoor expansion valve 15 is controlled to its minimum opening degree. The indoor expansion valve 31 is controlled to its maximum opening degree.

When the compressor 11, the outdoor fan 19, and the indoor fan 33 are driven in this state, the refrigerant is sucked via the second pipe P2 (suction pipe) into the compressor 11 and compressed. The high-pressure gas refrigerant that has been compressed flows via the third pipe P3 (discharge pipe), the four-way switching valve 12, the first pipe P1, and the gas connection pipe GP into the indoor heat exchanger 32 and condenses.

The refrigerant that has traveled through the indoor heat exchanger 32 flows via the indoor expansion valve 31, the liquid connection pipe LP, the seventh pipe P7, the first flow path 161 of the subcooling heat exchanger 16, and the sixth pipe P6 into the first outdoor expansion valve 14. The refrigerant that has flowed into the first outdoor expansion valve 14 has its pressure reduced in accordance with the opening degree.

The refrigerant that has traveled through the first outdoor expansion valve 14 flows via the fifth pipe P5 into the outdoor heat exchanger 13 and evaporates. The refrigerant that has traveled through the outdoor heat exchanger 13 is sucked back into the compressor 11 via the fourth pipe P4, the four-way switching valve 12, and the second pipe P2.

(2-3) Flow of Refrigerant in Refrigerant Quantity Determination Mode

In the refrigerant quantity determination mode (refrigerant quantity determination operation), the actuators are controlled to be in substantially the same state as in the cooling mode. Because of this, in the refrigerant circuit RC, the refrigerant flows with substantially the same flow as in the cooling mode.

However, in the refrigerant quantity determination mode (refrigerant quantity determination operation), the operating states of the actuators are fixed until the refrigerant quantity determination operation is completed. Specifically, the rotational speed of the compressor 11 is fixed anywhere from maximum to rated. Also, the opening degree of the first outdoor expansion valve 14 is fixed at the maximum opening degree, and the second outdoor expansion valve 15 and the indoor expansion valve 31 are fixed at opening degrees set beforehand (in a control program). Furthermore, the outdoor fan 19 and the indoor fan 33 are fixed at rotational speeds set beforehand (in the control program).

(3) Controller 50

Figure 3:
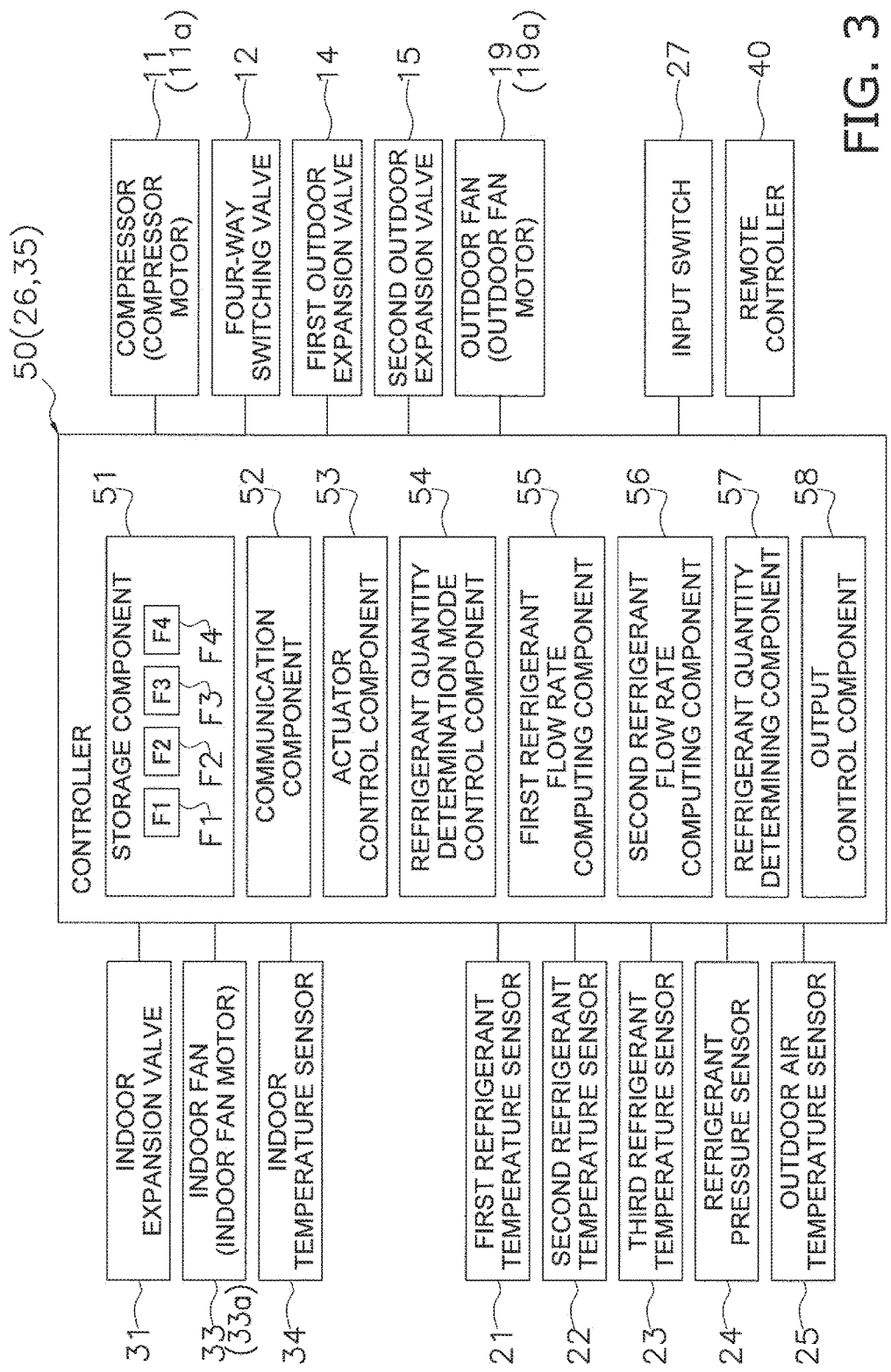
FIG. 3 is a block diagram showing a controller and parts connected to the controller.

In the air conditioning system 100, the controller 50 is configured as a result of the outdoor unit control component 26 and the indoor unit control component 35 being interconnected by a communication line. FIG. 3 is a block diagram showing the controller 50 and parts connected to the controller 50.

The controller 50 is electrically connected to the actuators included in the air conditioning system 100 (specifically, the compressor 11 (the compressor motor 11a), the four-way switching valve 12, the first outdoor expansion valve 14, the second outdoor expansion valve 15, the outdoor fan 19 (the outdoor fan motor 19a), the indoor expansion valve 31, and the indoor fan 33 (the indoor fan motor 33a)). Also, the controller 50 is electrically connected to the sensors included in the air conditioning system 100 (specifically, the first refrigerant temperature sensor 21, the second refrigerant temperature sensor 22, the third refrigerant temperature sensor 23, the refrigerant pressure sensor 24, the outdoor air temperature sensor 25, and the indoor temperature sensor 34). Furthermore, the controller 50 is electrically connected to the input switch 27 for receiving an instruction to start the refrigerant quantity determination operation. Furthermore, the controller 50 is connected via a communication network to, in such a way that it can send signals to and receive signals from, the remote controller 40 that serves as an input device and output device.

The controller 50 mainly has a storage component 51, a communication component 52, an actuator control component 53 (which corresponds to a "control component" in the claims), a refrigerant quantity determination mode control component 54, a first refrigerant flow rate computing component 55 (which corresponds to a "first refrigerant flow rate calculating component" in the claims), a second refrigerant flow rate computing component 56 (which corresponds to a "second refrigerant flow rate calculating component" in the claims), a refrigerant quantity determining component 57 (which corresponds to a "determining component" in the claims), and an output control component 58. It should be noted that these components in the controller 50 are realized by functional components included in the outdoor unit control component 26 and/or the indoor unit control component 35.

(3-1) Storage Component 51

The storage component 51 is configured by a ROM, a RAM, a flash memory and/or the like for example, and includes a volatile storage area and a nonvolatile storage area. The control program in which is defined processing in each component of the controller 50 is stored in the storage component 51. Furthermore, predetermined information (e.g., the detection values of the sensors, etc.) is appropriately stored in a predetermined storage area of the storage component 51 by the components of the controller 50. Furthermore, plural flags having a predetermined number of bits are provided in the storage component 51. For example, a start/stop flag F1, a mode flag F2, a refrigerant quantity determination operation flag F3 and a refrigerant quantity deficiency flag F4 and the like. The start/stop flag F1 is configured and arranged for identifying whether or not an instruction to start operating has been input. The mode flag F2 is configured and arranged for identifying the operating mode that has been selected. The refrigerant quantity determination operation flag F3 is configured and arranged for identifying that the input switch 27 has been operated. The refrigerant quantity deficiency flag F4 is configured and arranged for identifying that the quantity of refrigerant with which the refrigerant circuit RC is charged is deficient.

(3-2) Communication Component 52

The communication component 52 is a functional component that fulfills a role as a communication interface for sending signals to and receiving signals from the devices connected to the controller 50. The communication component 52 receives requests from the actuator control component 53 and sends predetermined signals to designated actuators. Furthermore, the communication component 52 receives signals output from the sensors (21 to 25, 34) and the remote controller 40, stores the signals in corresponding storage area in the storage component 51, and sets predetermined flags.

(3-3) Actuator Control Component 53

The actuator control component 53 controls the operations of the actuators (e.g., the compressor 11, the first outdoor expansion valve 14, and the second outdoor expansion valve 15, etc.) of the air conditioning system 100 in accordance with the situation. The actuator control component 53 discriminates the start/stop state selected by the user from the information stored in the storage component 51 (e.g., the start/stop flag F1). The actuator control component 53 discriminates the operating mode selected by the user on the basis of information stored in the storage component 51 (e.g., the mode flag F2). Furthermore, the actuator control component 53 recognizes the detection values of the sensors from information stored in the storage component 51. In a case where an instruction to start operating has been input, the actuator control component 53 controls the operations of the actuators in accordance with the selected operating mode and the detection values of the sensors in line with the control program.

In the refrigerant quantity determination mode, the actuator control component 53 controls the actuators (e.g., the compressor 11, the first outdoor expansion valve 14, and the second outdoor expansion valve 15, etc.) in such a way that operating states become fixed.

(3-4) Refrigerant Quantity Determination Mode Control Component 54

In a case where the air conditioning system 100 is in a standby state (a state in which operation is stopped), the refrigerant quantity determination mode control component 54 determines, from information stored in the storage component 51 (e.g., the refrigerant quantity determination operation flag F3), whether or not an instruction to start the refrigerant quantity determination operation has been input by the user. Furthermore, the refrigerant quantity determination mode control component 54 is configured to be capable of counting time, and discriminates whether or not a predetermined amount of time t1 has elapsed since the previous refrigerant quantity determination operation was completed. When, in this case, the refrigerant quantity determination mode control component 54 has determined that an instruction to start the refrigerant quantity determination operation has been input, or has determined that the predetermined amount of time t1 has elapsed since the previous refrigerant quantity determination operation was completed, the refrigerant quantity determination mode control component 54 causes the operating mode to transition to the refrigerant quantity determination mode and executes the refrigerant quantity determination operation on the condition that the outdoor air temperature To and the indoor temperature Ti are in predetermined ranges. Specifically, the refrigerant quantity determination mode control component 54 causes the operating mode to transition to the refrigerant quantity determination mode and executes the refrigerant quantity determination operation on the condition that the outdoor air temperature To is greater than a predetermined standard value Sv1 and less than a standard value Sv2 and the indoor temperature Ti is greater than a predetermined standard value Sv3 and less than a standard value Sv4. The refrigerant quantity determination mode control component 54 sets the mode flag F2 corresponding to the refrigerant quantity determination mode when causing the operating mode to transition to the refrigerant quantity determination mode.

It should be noted that, in the present embodiment, the predetermined amount of time t1 is set to 720 hours (i.e., 30 days). Furthermore, the standard value Sv1 is set to 2(° C.), the standard value Sv2 is set to 45(° C.), the standard value Sv3 is set to 18(° C.), and the standard value Sv4 is set to 34(° C.).

(3-5) First Refrigerant Flow Rate Computing Component 55

The first refrigerant flow rate computing component 55 is a functional component that calculates a first refrigerant flow rate Fr1 using predetermined information in line with the control program. The first refrigerant flow rate computing component 55 is configured to be capable of counting time, and calculates the first refrigerant flow rate Fr1 after a predetermined amount of time t2 has elapsed since the mode flag F2 corresponding to the refrigerant quantity determination mode was set. In the present embodiment, the predetermined amount of time t2 is set to 3 minutes.

The first refrigerant flow rate Fr1 is the flow rate of the refrigerant flowing through the bypass circuit RC2 (more specifically, the second flow path 162 of the subcooling heat exchanger 16), and is calculated on the basis of refrigeration cycle theory. Specifically, the first refrigerant flow rate computing component 55 calculates the first refrigerant flow rate Fr1, according to formula F1 defined as follows, on the basis of a refrigerant circulation quantity Gr determined from the characteristics of the compressor 11, the enthalpy $h(T_L)$ of the refrigerant flowing through the sixth pipe P6 (i.e., the refrigerant flowing into the branching portion BP) calculated on the basis of the detection value of the first refrigerant temperature sensor 21, the enthalpy h(Tsc) of the refrigerant flowing through the seventh pipe P7 (i.e., the refrigerant flowing out from the first flow path 161) calculated on the basis of the detection value of the second refrigerant temperature sensor 22, and the enthalpy h(Tsh) of the refrigerant flowing through the tenth pipe P10 (i.e., the refrigerant flowing out from the second flow path 162) calculated on the basis of the detection value of the third refrigerant temperature sensor 23.

$$Fr1 = Gr \times (h(T_L) - h(Tsc)) / \{(h(Tsh) - h(T_L)) + h(T_L) - h(Tsc))\} \quad \text{F1}$$

Fr1: first refrigerant flow rate
Gr: refrigerant circulation quantity determined from characteristics of compressor 11
$h(T_L)$: enthalpy of refrigerant flowing through sixth pipe P6 (i.e., refrigerant flowing into branching portion BP) calculated on the basis of detection value of first refrigerant temperature sensor 21
h(Tsc): enthalpy of refrigerant flowing through seventh pipe P7 (i.e., refrigerant flowing out from first flow path 161) calculated on the basis of detection value of second refrigerant temperature sensor 22
h(Tsh): enthalpy of refrigerant flowing through tenth pipe P10 (i.e., refrigerant flowing out from second flow path 162) calculated on the basis of detection value of third refrigerant temperature sensor 23

It should be noted that a refrigerant circulation quantity table in which is defined the refrigerant circulation quantity Gr calculated on the basis of the characteristics of the compressor 11 (a compressor characteristic curve) is stored beforehand in the storage component 51, and the first refrigerant flow rate computing component 55 finds the refrigerant circulation quantity Gr on the basis of the refrigerant circulation quantity table.

Furthermore, an enthalpy table in which enthalpies are defined on the basis of the detection values of the temperature sensors is stored beforehand in the storage component 51, and the first refrigerant flow rate computing component 55 finds the enthalpies $h(T_L)$, h(Tsc), and h(Tsh) on the basis of the enthalpy table.

That is, the first refrigerant flow rate computing component 55 calculates the first refrigerant flow rate Fr1 on the basis of the measurement value of the first refrigerant temperature sensor 21, the measurement value of the second refrigerant temperature sensor 22, the measurement value of the third refrigerant temperature sensor 23, and the refrigerant circulation quantity Gr determined from the characteristics of the compressor 11.

(3-6) Second Refrigerant Flow Rate Computing Component 56

The second refrigerant flow rate computing component 56 is a functional component that calculates a second refrigerant flow rate Fr2 using predetermined information in line with the control program. The second refrigerant flow rate computing component 56 is configured to be capable of counting time, and calculates the second refrigerant flow rate Fr2 after the predetermined amount of time t2 has elapsed since the mode flag F2 corresponding to the refrigerant quantity determination mode was set.

The second refrigerant flow rate Fr2 is the flow rate of the refrigerant flowing through the bypass circuit RC2 (more specifically, the second flow path 162 of the subcooling heat exchanger 16), and is calculated on the basis of fluid theory.

Specifically, the second refrigerant flow rate computing component 56 calculates the second refrigerant flow rate Fr2, according to formula F2 defined as follows, on the basis of the Cv value of the second outdoor expansion valve 15, the detection value (i.e., the refrigerant pressure on the suction side of the compressor 11) Pe of the refrigerant pressure sensor 24, the corresponding saturated pressure value $P(T_L)$ of the refrigerant flowing through the sixth pipe P6 (i.e., the refrigerant flowing into the branching portion BP) calculated on the basis of the detection value of the first refrigerant temperature sensor 21, and a corresponding saturated liquid density $\rho cl(T_L)$ of the refrigerant flowing through the sixth pipe P6 (i.e., the refrigerant flowing into the branching portion BP) calculated on the basis of the detection value of the first refrigerant temperature sensor 21.

$$Fr2 = 27.09 \times Cv \times ((P(T_L) - Pe) \times \rho cl(T_L))^{\wedge}0.5 \quad \text{F2}$$

Fr2: second refrigerant flow rate
Cv: Cv value of second outdoor expansion valve 15
Pe: detection value of refrigerant pressure sensor 24 (i.e., refrigerant pressure on suction side of compressor 11)
$P(T_L)$: corresponding saturated pressure value of refrigerant flowing through sixth pipe P6 (i.e., refrigerant flowing into branching portion BP) calculated on the basis of detection value of first refrigerant temperature sensor 21
$\rho cl(T_L)$: corresponding saturated liquid density of refrigerant flowing through sixth pipe P6 (i.e., refrigerant flowing into branching portion BP) calculated on the basis of detection value of first refrigerant temperature sensor 21

It should be noted that a corresponding saturated pressure table in which the corresponding saturated pressure value $P(T_L)$ is defined on the basis of the detection value of the first refrigerant temperature sensor 21 is stored beforehand in the storage component 51, and the second refrigerant flow rate computing component 56 finds the corresponding saturated pressure value $P(T_L)$ on the basis of the corresponding saturated pressure table.

Also, a flow rate characteristic table in which the Cv value is defined on the basis of the opening degree of the second outdoor expansion valve 15 is stored beforehand in the storage component 51, and the second refrigerant flow rate computing component 56 finds the Cv value of the second outdoor expansion valve 15 on the basis of the flow rate characteristic table. It should be noted that the Cv value of the second outdoor expansion valve 15 is a coefficient representing the flow rate characteristic of the second outdoor expansion valve 15 and has a correlation with the opening degree of the second outdoor expansion valve 15.

Furthermore, a corresponding saturated liquid density table in which the corresponding saturated liquid density $\rho cl(T_L)$ is defined on the basis of the detection value of the first refrigerant temperature sensor 21 is stored beforehand in the storage component 51, and the second refrigerant flow rate computing component 56 finds the corresponding saturated liquid density $\rho cl(T_L)$ on the basis of the corresponding saturated liquid density table.

That is, the second refrigerant flow rate computing component 56 calculates the second refrigerant flow rate Fr2 on the basis of the measurement value of the first refrigerant temperature sensor 21, the measurement value of the refrigerant pressure sensor 24, the opening degree of the second outdoor expansion valve 15, and the corresponding saturated liquid density $\rho cl(T_L)$ of the refrigerant flowing into the branching portion BP.

(3-7) Refrigerant Quantity Determining Component 57

The refrigerant quantity determining component 57 is a functional component that performs a determination (hereinafter called a "refrigerant quantity determination") of whether or not the refrigerant circuit RC is charged with the proper quantity of refrigerant (i.e., whether or not refrigerant leakage is occurring or whether or not charging with the refrigerant has been properly performed) by comparing the first refrigerant flow rate Fr1 calculated by the first refrigerant flow rate computing component 55 and the second refrigerant flow rate Fr2 calculated by the second refrigerant flow rate computing component 56. The refrigerant quantity determining component 57 performs the refrigerant quantity determination on the basis of whether or not a value (hereinafter called a "determination value Dv1") obtained by dividing the second refrigerant flow rate Fr2 by the first refrigerant flow rate Fr1 is equal to or greater than a predetermined first threshold value ΔTh1.

Specifically, in a case where the determination value Dv1 is less than the first threshold value ΔTh1, the refrigerant quantity determining component 57 determines that the quantity of refrigerant with which the refrigerant circuit RC is charged is not deficient (i.e., that refrigerant leakage is not occurring or that charging with the refrigerant has been properly performed) and cancels the mode flag F2 corresponding to the refrigerant quantity determination mode.

In a case where the determination value Dv1 is equal to or greater than the first threshold value ΔTh1, the refrigerant quantity determining component 57 determines that the quantity of refrigerant with which the refrigerant circuit RC is charged is deficient (i.e., that refrigerant leakage is occurring or that charging with the refrigerant has not been properly performed) and sets the refrigerant quantity deficiency flag F4 in the storage component 51.

Furthermore, in a case where the determination value Dv1 is equal to or greater than the first threshold value ΔTh1, the refrigerant quantity determining component 57 calculates the percentage (hereinafter called a "refrigerant deficit Rt1") by which the determination value Dv1 exceeds the first threshold value ΔTh1 and stores the calculated refrigerant deficit Rt1 in a predetermined area of the storage component 51.

It should be noted that, as the first threshold value ΔTh1, a value taking into account calculation error based on changes in the heat load and the environment is defined beforehand in the control program. In the present embodiment, the first threshold value ΔTh1 is set to equal 5.

(3-8) Output Control Component 58

The output control component 58 is a functional component that controls images displayed on, and audio output by, the remote controller 40. The output control component 58 generates, in accordance with the operating state, signals corresponding to images to be displayed on, and audio to be output by, the remote controller 40, and outputs the signals via the communication component 52.

The output control component 58 performs abnormality warning processing when the refrigerant quantity deficiency flag F4 in the storage component 51 is set. Specifically, in the abnormality warning processing, the output control component 58 outputs a predetermined signal to the remote controller 40, has the remote controller 40 display an image indicating that there is refrigerant leakage or that the refrigerant charge is deficient, and has the remote controller 40 output a predetermined warning. At that time, the output control component 58 references the refrigerant deficit Rt1 stored in the storage component 51 and has the remote controller 40 display the Rt1.

(4) Flow of Processing by Controller 50

Figure 4:
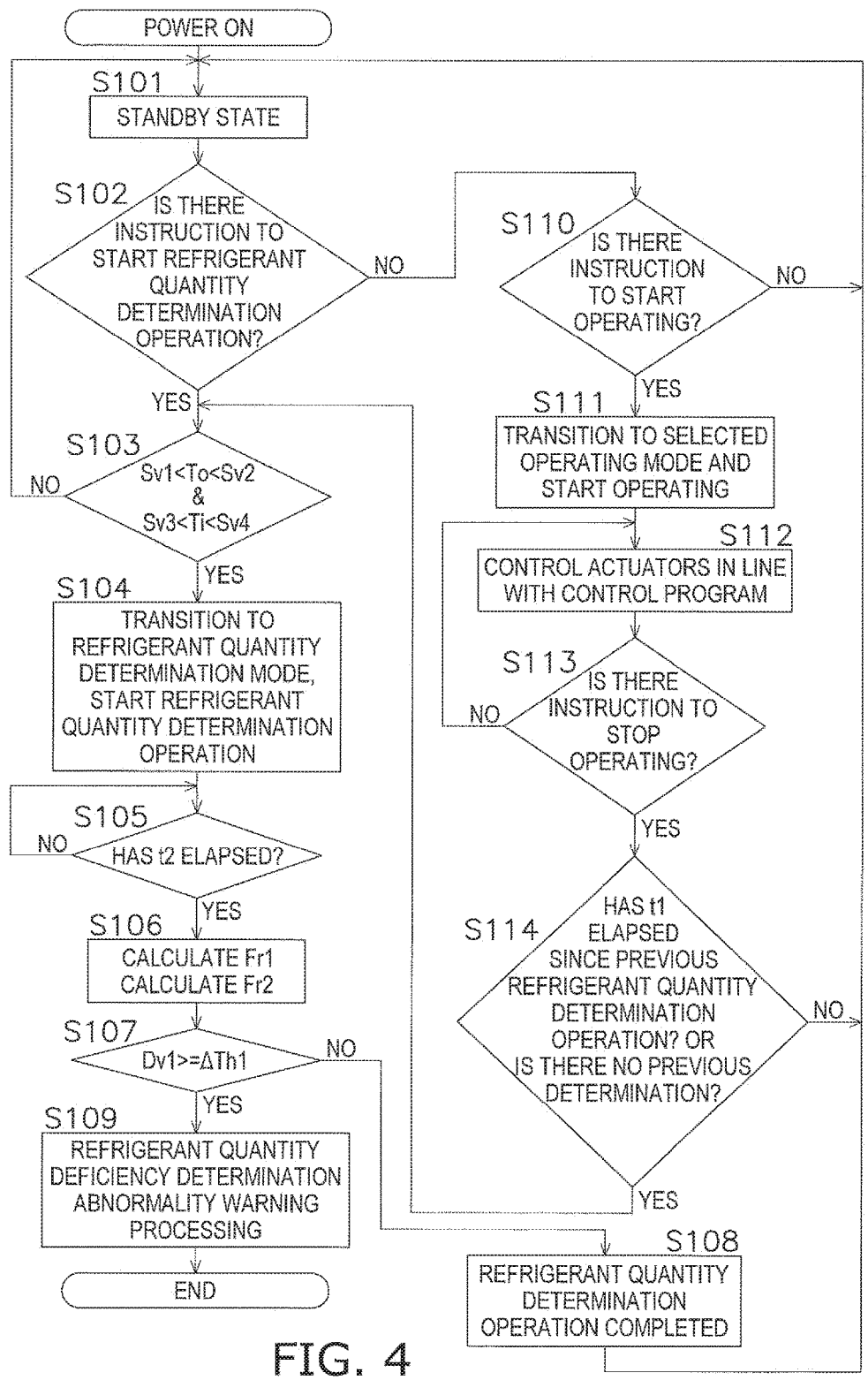
FIG. 4 is a flowchart showing an example of a flow of processing by the controller.

An example of a flow of processing by the controller 50 will be described below with reference to FIG. 4. FIG. 4 is a flowchart showing an example of a flow of processing by the controller 50.

When the controller 50 is powered on, it performs processing with the following flow. It should be noted that the flow of processing shown in FIG. 4 and described below is an example and can be appropriately changed.

In step S101 the controller 50 enters a standby state (a state in which operation is stopped). Thereafter, the controller 50 proceeds to step S102.

In step S102 the controller 50 determines whether or not an instruction to start the refrigerant quantity determination operation has been input (i.e., whether or not the input switch 27 has been operated). In a case where the determination is NO (i.e., in a case where an instruction to start the refrigerant quantity determination operation has not been input), the controller 50 proceeds to step S110. On the other hand, in a case where the determination is YES (i.e., in a case where an instruction to start the refrigerant quantity determination operation has been input), the controller 50 proceeds to step S103.

In step S103 the controller 50 determines whether or not the outdoor air temperature To is greater than the standard value Sv1 and less than the standard value Sv2 and the indoor temperature Ti is greater than the standard value Sv3 and less than the standard value Sv4. In a case where the determination is NO (i.e., in a case where the outdoor air temperature To is not greater than the standard value Sv1 and less than the standard value Sv2 and the indoor temperature Ti is not greater than the standard value Sv3 and less than the standard value Sv4), the controller 50 returns to step S101. On the other hand, in a case where the determination is YES (i.e., in a case where the outdoor air temperature To is greater than the standard value Sv1 and less than the standard value Sv2 and the indoor temperature Ti is greater than the standard value Sv3 and less than the standard value Sv4), the controller 50 proceeds to step S104.

In step S104 the controller 50 transitions to the refrigerant quantity determination mode and starts the refrigerant quantity determination operation. Because of this, the actuators are controlled to predetermined states, and the refrigerant circulates in the refrigerant circuit RC. Thereafter, the controller 50 proceeds to step S105.

In step S105 the controller 50 determines whether or not the predetermined amount of time t2 has elapsed since starting the refrigerant quantity determination operation. In a case where the determination is NO (i.e., in a case where the predetermined amount of time t2 has not elapsed), the controller 50 repeats the determination. On the other hand, in a case where the determination is YES (i.e., in a case where the predetermined amount of time t2 has elapsed), the controller 50 proceeds to step S106.

In step S106, the controller 50 calculates the first refrigerant flow rate Fr1 and the second refrigerant flow rate Fr2. Thereafter, the controller 50 proceeds to step S107.

In step S107, the controller 50 determines whether or not the determination value Dv1 is equal to or greater than the first threshold value ΔTh1 on the basis of the first refrigerant flow rate Fr1 and the second refrigerant flow rate Fr2. In a case where the determination is NO (i.e., in a case where the determination value Dv1 is less than the first threshold value ΔTh1), the controller 50 proceeds to step S108. On the other hand, in a case where the determination is YES (i.e., in a case where the determination value Dv1 is equal to or greater than the first threshold value ΔTh1), the controller 50 proceeds to step S109.

In step S108 the controller 50 determines that the refrigerant charge is proper (i.e., that refrigerant leakage is not occurring or that charging with the refrigerant has been properly performed) and ends the refrigerant quantity determination operation. Thereafter, the controller 50 returns to step S101.

In step S109 the controller 50 determines that the refrigerant charge is deficient (i.e., that refrigerant leakage is occurring or that charging with the refrigerant has not been properly performed) and has the remote controller 40 perform the abnormality warning processing. Thereafter, the controller 50 has the remote controller 40 continue the abnormality warning processing until it is reset by a service technician or a user.

In step S110 the controller 50 determines whether or not an instruction to start a routine air conditioning operation has been input. In a case where the determination is NO (i.e., in a case where an instruction to start an air conditioning operation has not been input), the controller 50 returns to step S101. On the other hand, in a case where the determination is YES (i.e., in a case where an instruction to start an air conditioning operation has been input), the controller 50 proceeds to step S111.

In step S11 the controller 50 transitions to the operating mode (the cooling mode or the heating mode) selected by the user and starts the corresponding operation (the cooling operation or the heating operation). Thereafter, the controller 50 proceeds to step S112.

In step S112 the controller 50 appropriately controls the actuators in line with the control program. Thereafter, the controller 50 proceeds to step S113.

In step S113 the controller 50 determines whether or not an instruction to stop operating has been input. In a case where the determination is NO (i.e., in a case where an instruction to stop operating has not been input), the controller 50 returns to step S112. On the other hand, in a case where the determination is YES (i.e., in a case where an instruction to stop operating has been input), the controller 50 proceeds to step S114.

In step S114 the controller 50 determines whether or not the predetermined amount of time t1 has elapsed since the completion of the previous refrigerant quantity determination operation or whether or not no previous refrigerant quantity determination operation has been performed (i.e., no refrigerant quantity determination operation has been performed even once since being powered on). In a case where the determination is NO (i.e., in a case where a previous refrigerant quantity determination operation has been performed and the controller 50 has determined that the predetermined amount of time t1 has not elapsed since the completion of the previous refrigerant quantity determination operation), the controller 50 returns to step S101. On the other hand, in a case where the determination is YES (i.e., in a case where the controller 50 has determined that the predetermined amount of time t1 has elapsed since the completion of the previous refrigerant quantity determination operation or that no previous refrigerant quantity determination operation has been performed), the controller 50 returns to step S103.

(5) Details of Refrigerant Quantity Determination

In the refrigerant quantity determination, a deficiency in the refrigerant quantity (whether or not there is refrigerant leakage or refrigerant charge deficiency) was determined by comparing the first refrigerant flow rate Fr1 calculated on the basis of refrigeration cycle theory (the enthalpy of the refrigerant, etc.) and the second refrigerant flow rate Fr2 calculated on the basis of fluid theory (the pressure of the refrigerant, etc.).

The refrigerant quantity determination is based on the following idea.

Figure 5:
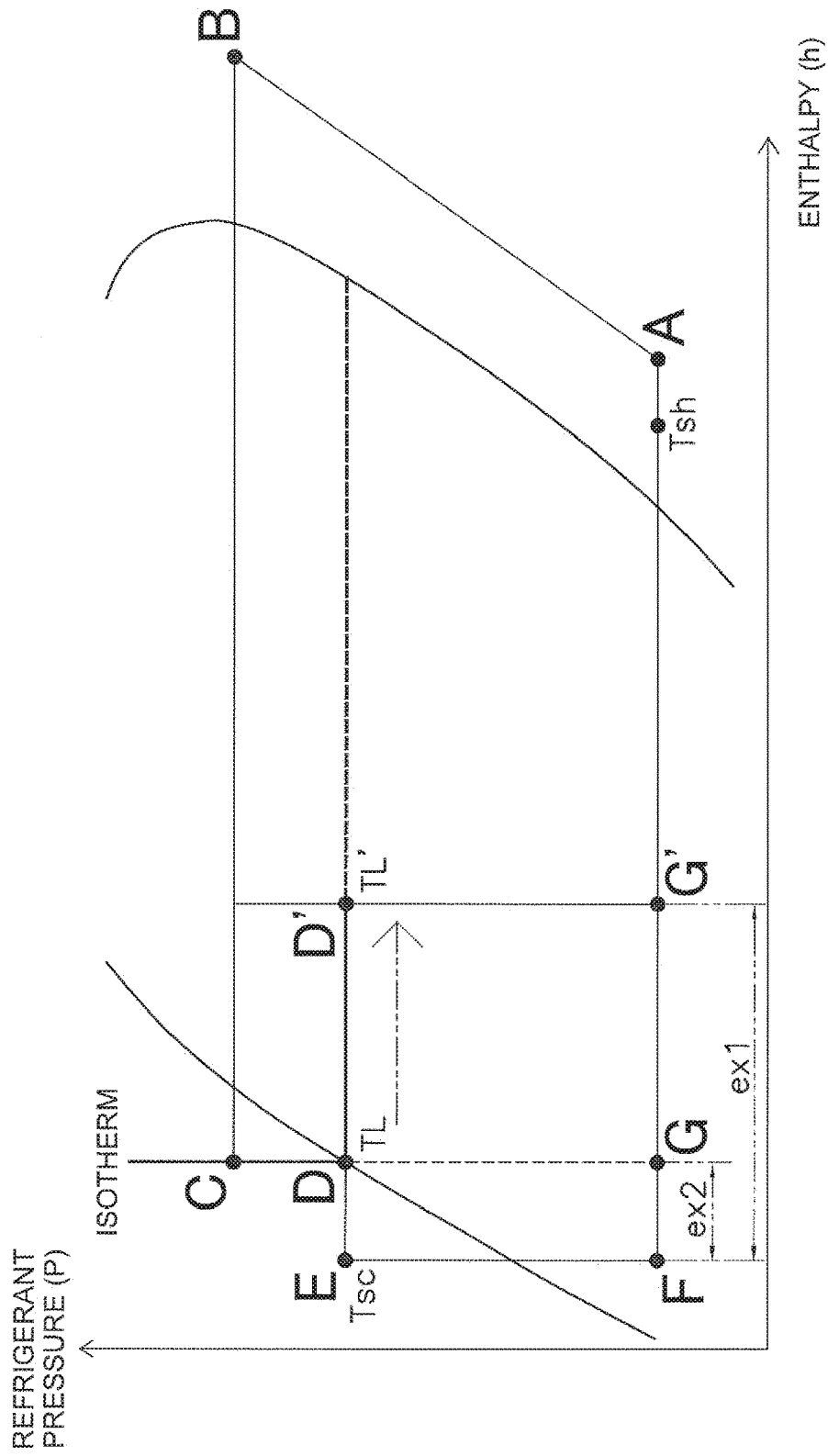
FIG. 5 is a Mollier diagram showing the refrigeration cycle in a case where the refrigerant charge in the air conditioning system is deficient.

That is, the refrigerant flowing through the bypass circuit RC2 is normally (when the refrigerant charge is in a proper state) in the state indicated by D-G in FIG. 5, and, when the refrigerant charge is deficient, is in the state indicated by D'-G' in FIG. 5.

Here, if an entropy calculation is performed from the detection value of the first refrigerant temperature sensor 21, it cannot be discriminated whether the state of the refrigerant flowing into the branching portion BP (i.e., see D in FIG. 2 and D' in FIG. 5) is a saturated liquid state or a gas-liquid two-phase state because it is positioned on an isotherm.

On the other hand, if the refrigerant charge is deficient, the state of the refrigerant flowing into the branching portion BP becomes a gas-liquid two-phase state (see D' in FIG. 5), and the refrigerant at D in FIG. 5 and the refrigerant at D' in FIG. 5 have different enthalpies even though their temperatures are the same.

In this case, although in actuality heat exchange corresponding to $T_L'$–Tsc (see ex1 in FIG. 5) takes place, it is recognized as heat exchange corresponding to $T_L$–Tsc (see ex2 in FIG. 5), so if the first refrigerant flow rate Fr1 is calculated using formula F1, it is calculated as a lesser value than the flow rate of the refrigerant actually flowing through the bypass circuit RC2.

Meanwhile, regarding the second refrigerant flow rate Fr2 calculated on the basis of fluid theory (the pressure loss coefficient (Cv value), etc.), if a deficiency in the refrigerant charge arises, the second refrigerant flow rate Fr2 is calculated on the basis of the saturated liquid density ρcl that is larger than the actual liquid density of the refrigerant, so it becomes calculated as a larger value than the flow rate of the refrigerant actually flowing through the bypass circuit RC2.

Figure 6:
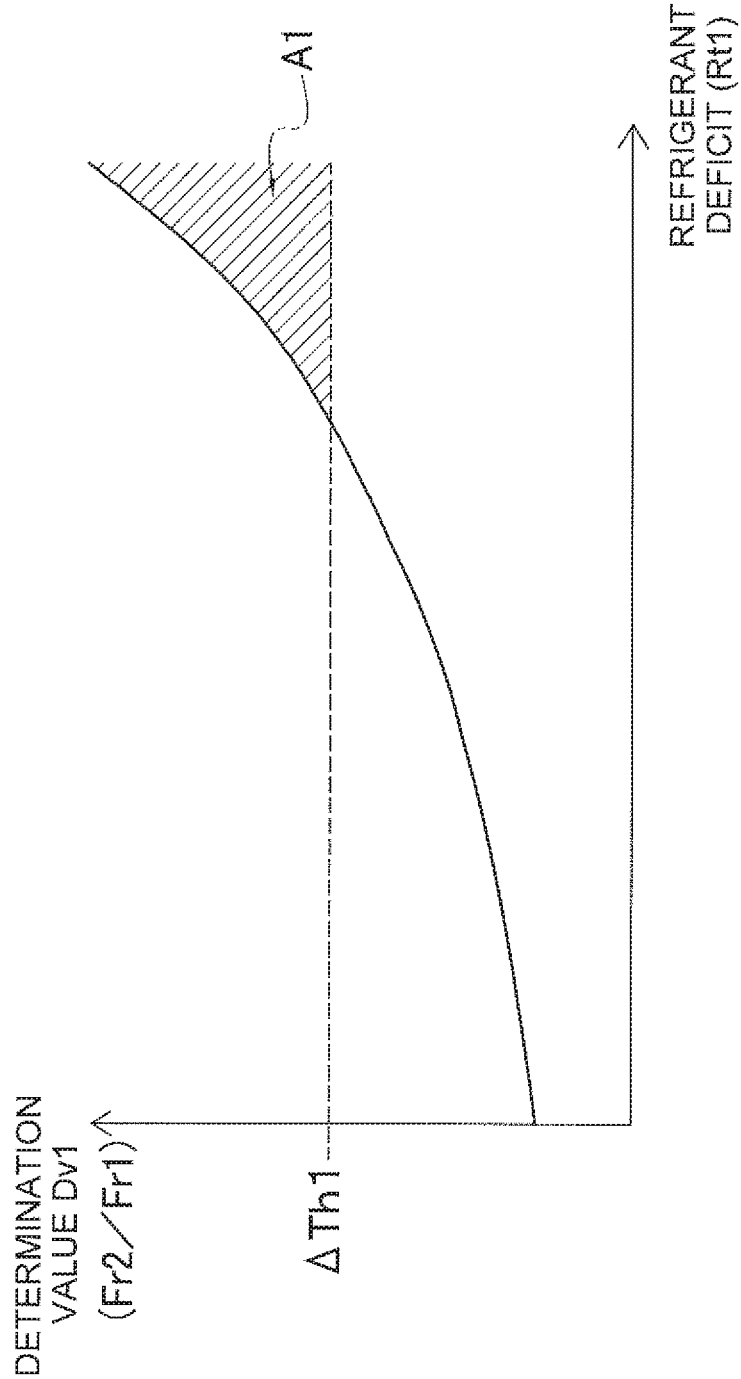
FIG. 6 is a schematic diagram showing the relationship between a ratio (determination value) of a second refrigerant flow rate to a first refrigerant flow rate and a refrigerant deficit (the degree of the deficiency in the refrigerant charge).

That is, if the refrigerant charge is deficient, the flow rate of the refrigerant flowing through the bypass circuit RC2 becomes calculated as a value (the first refrigerant flow rate Fr1) smaller than what it actually is when it is calculated on the basis of refrigeration cycle theory (i.e., using formula F1), and becomes calculated as a value (the second refrigerant flow rate Fr2) larger than what it actually is when it is calculated on the basis of fluid theory (i.e., using formula F2). As shown in FIG. 6, the ratio (i.e., the determination value Dv1) of the second refrigerant flow rate Fr2 to the first refrigerant flow rate Fr1 in this case increases like a quadratic curve as the percentage (the refrigerant deficit Rt1) of the deficiency in the refrigerant charge increases.

In the refrigerant quantity determination of the present embodiment, the first threshold value ΔTh1 is set on the basis of this principle, and the controller 50 determines that a deficiency in the refrigerant charge (refrigerant leakage or a deficiency in the refrigerant charging) is occurring in a case where the determination value Dv1 is calculated as a value equal to or greater than the first threshold value ΔTh1 (see hatched region A1 in FIG. 6).

Furthermore, as the degree of the deficiency in the refrigerant charge increases, the percentage by which the determination value Dv1 exceeds the first threshold value ΔTh1 increases. From this, it is possible to not only determine whether or not there is a deficiency in the refrigerant charge but also to determine the extent of the refrigerant charge (the refrigerant deficit Rt1).

(6) Characteristics (6-1)

In the above embodiment, the first refrigerant flow rate computing component 55 calculates, as the first refrigerant flow rate Fr1 on the basis of refrigeration cycle theory, the flow rate of the refrigerant flowing through the bypass circuit RC2. The second refrigerant flow rate computing component 56 calculates, as the second refrigerant flow rate Fr2 on the basis of fluid theory, the flow rate of the refrigerant flowing through the bypass circuit RC2. The refrigerant quantity determining component 57 determines whether or not there is refrigerant leakage or refrigerant charge deficiency on the basis of the result of the comparison of the first refrigerant flow rate Fr1 and the second refrigerant flow rate Fr2 that have been calculated.

Because of this, the flow rate of the refrigerant flowing through the bypass circuit RC2 is calculated as the first refrigerant flow rate Fr1 based on refrigeration cycle theory and is calculated as the second refrigerant flow rate Fr2 based on fluid theory, and whether or not there is refrigerant leakage or refrigerant charge deficiency is determined by the comparison of the first refrigerant flow rate Fr1 and the second refrigerant flow rate Fr2. As a result, it is possible to perform the determination of whether or not there is refrigerant leakage or refrigerant charge deficiency without requiring the time and effort of calculating beforehand by test or simulation the optimum refrigerant quantity. Accordingly, in actual applying for the air conditioning system, the number of man hours for development is restrained from increasing.

Furthermore, by comparing the first refrigerant flow rate Fr1 and the second refrigerant flow rate Fr2, when refrigerant leakage or refrigerant charge deficiency is occurring, it is also possible to determine the extent of the leakage or deficiency (the refrigerant deficit Rt1).

Therefore, it is possible to determine with high precision whether or not there is refrigerant leakage or refrigerant charge deficiency while restraining costs increasing.

(6-2)

In the above embodiment, the air conditioning system 100 is equipped with the first refrigerant temperature sensor 21 for measuring the enthalpy of the refrigerant flowing into the branching portion BP, the second refrigerant temperature sensor 22 for measuring the enthalpy of the refrigerant flowing out from the first flow path 161, and the third refrigerant temperature sensor 23 for measuring the enthalpy of the refrigerant flowing out from the second flow path 162. Because of this, the first refrigerant flow rate Fr1 is calculated with a simple configuration.

(6-3)

In the above embodiment, the first refrigerant flow rate computing component 55 calculates the first refrigerant flow rate Fr1 on the basis of the enthalpy $h(T_L)$ based on the measurement value of the first refrigerant temperature sensor 21, the enthalpy h(Tsc) based on the measurement value of the second refrigerant temperature sensor 22, the enthalpy h(Tsh) based on the measurement value of the third refrigerant temperature sensor 23, and the refrigerant circulation quantity (Gr) based on the characteristics of the compressor 11. Because of this, the first refrigerant flow rate Fr1 is calculated with high precision.

(6-4)

In the above embodiment, the air conditioning system 100 is further equipped with the first refrigerant temperature sensor 21 for measuring the corresponding saturated pressure of the refrigerant flowing into the branching portion BP and the refrigerant pressure sensor 24 for measuring the refrigerant pressure Pe on the suction side of the compressor 11. Because of this, the second refrigerant flow rate Fr2 is calculated with a simple configuration.

(6-5)

In the above embodiment, the second refrigerant flow rate computing component 56 calculates the second refrigerant flow rate Fr2 on the basis of the corresponding saturated pressure value $P(T_L)$ based on the measurement value of the first refrigerant temperature sensor 21, the measurement value Pe of the refrigerant pressure sensor 24, the opening degree of the second outdoor expansion valve 15, and the corresponding saturated liquid density $\rho cl(T_L)$ of the refrigerant flowing into the branching portion BP. Because of this, the second refrigerant flow rate Fr2 is calculated with high precision.

(6-6)

In the above embodiment, the first refrigerant temperature sensor 21 detects the temperature $T_L$ of the refrigerant flowing into the branching portion BP, the second refrigerant temperature sensor 22 detects the temperature Tsc of the refrigerant flowing out from the first flow path 161, and the third refrigerant temperature sensor 23 detects the temperature Tsh of the refrigerant flowing out from the second flow path 162. Because of this, it is possible to calculate the first refrigerant flow rate Fr1 while further restraining costs increasing.

(6-7)

In the above embodiment, the refrigerant quantity determining component 57 determines whether or not there is refrigerant leakage or refrigerant charge deficiency on the basis of the result of the comparison of the value obtained by dividing the second refrigerant flow rate Fr2 by the first refrigerant flow rate Fr1 and the predetermined first threshold value ΔTh1. Because of this, highly precise determination is possible by means of simple computation.

(6-8)

In the above embodiment, when the first refrigerant flow rate computing component 55 or the second refrigerant flow rate computing component 56 calculates the first refrigerant flow rate Fr1 or the second refrigerant flow rate Fr2, the actuator control component 53 performs control so that the operating states of the compressor 11, the first outdoor expansion valve 14, and the second outdoor expansion valve 15 is fixed. Because of this, the first refrigerant flow rate Fr1 and the second refrigerant flow rate Fr2 are stably and precisely calculated.

(6-9)

In the above embodiment, in a case where the outdoor air temperature To and the indoor temperature Ti meet a predetermined temperature condition, the controller 50 transitions to the refrigerant quantity determination mode, and the refrigerant quantity determining component 57 determines whether or not there is refrigerant leakage or refrigerant charge deficiency. Because of this, the first refrigerant flow rate Fr1 or the second refrigerant flow rate Fr2 are stably and precisely calculated.

(7) Example Modifications

The above embodiment can be appropriately modified as described in the following example modifications. It should be noted that each example modification may also be applied in combination with another example modification to the extent that incompatibilities do not arise.

(7-1) Example Modification A

In the above embodiment, the invention was applied to the air conditioning system 100. However, the invention is not limited to this and may also be applied to another refrigeration apparatus having a refrigerant circuit. For example, the invention may also be applied to a refrigeration apparatus such as a hot water supply system, a dehumidification system or the like.

(7-2) Example Modification B

In the above embodiment, the air conditioning system 100 had the one outdoor unit 10 as a heat source-side unit and the one indoor unit 30 as the utilization-side unit. However, the number of outdoor units 10 or indoor units 30 disposed in the air conditioning system 100 is not invariably limited to one, and may also be two or more.

(7-3) Example Modification C

In the above embodiment, the first refrigerant temperature sensor 21 was disposed in order to find the enthalpy $h(T_L)$ of the refrigerant flowing through the sixth pipe P6 (i.e., the refrigerant flowing into the branching portion BP), the second refrigerant temperature sensor 22 was disposed in order to find the enthalpy h(Tsc) of the refrigerant flowing through the seventh pipe P7 (i.e., the refrigerant flowing out from the first flow path 161), and the third refrigerant temperature sensor 23 was disposed in order to find the enthalpy h(Tsh) of the refrigerant flowing through the tenth pipe P10 (i.e., the refrigerant flowing out from the second flow path 162). However, a pressure sensor for finding the enthalpy h($T_L$), h(Tsc), or h(Tsh) may also be disposed instead of the first refrigerant temperature sensor 21, the second refrigerant temperature sensor 22, or the third refrigerant temperature sensor 23.

In this case, an enthalpy table in which are defined enthalpies based on the detection values of each pressure sensor is stored beforehand in the storage component 51, and the first refrigerant flow rate computing component 55 is configured to find the enthalpies h($T_L$), h(Tsc), and h(Tsh) on the basis of the detection values of each pressure sensor and the enthalpy table.

(7-4) Example Modification D

In the above embodiment, the second refrigerant flow rate computing component 56 found the corresponding saturated pressure value P($T_L$) on the basis of the corresponding saturated pressure table in which the corresponding saturated pressure value P($T_L$) is defined on the basis of the detection value of the first refrigerant temperature sensor 21. However, a pressure sensor may also be disposed separately from the first refrigerant temperature sensor 21, and the second refrigerant flow rate computing component 56 may also be configured to find the corresponding saturated pressure value P($T_L$) on the basis of the detection value of the pressure sensor.

(7-5) Example Modification E

In the above embodiment, the refrigerant pressure sensor 24 detected the refrigerant pressure Pe on the suction side of the compressor 11. However, a temperature sensor may also be disposed instead of the refrigerant pressure sensor 24, and the second refrigerant flow rate computing component 56 may also be configured to find the refrigerant pressure Pe on the suction side of the compressor 11 on the basis of the value of the temperature sensor.

(7-6) Example Modification F

The positions where the first refrigerant temperature sensor 21, the second refrigerant temperature sensor 22, the third refrigerant temperature sensor 23, and the refrigerant pressure sensor 24 are disposed in the above embodiment can be appropriately changed. That is, the positions where the sensors are disposed are not limited so long as the sensors are disposed in positions suitable for finding the enthalpies h($T_L$), h(Tsc), and h(Tsh), the refrigerant pressure Pe, the corresponding saturated pressure value P($T_L$), or the corresponding saturated liquid density ρcl($T_L$).

(7-7) Example Modification G

In the above embodiment, in the refrigerant quantity determination mode, the enthalpies h($T_L$), h(Tsc), and h(Tsh), the refrigerant circulation quantity Gr, the corresponding saturated pressure value P($T_L$), the corresponding saturated liquid density ρcl($T_L$), and the Cv value of the second outdoor expansion valve 15 were found on the basis of predetermined tables stored in the storage component 51. However, some or all of these may also be appropriately calculated in real time using a known technique.

(7-8) Example Modification H

In the above embodiment, the standard value Sv1 was set to 2(° C.), the standard value Sv2 was set to 45(° C.), the standard value Sv3 was set to 18 (° C.), and the standard value Sv4 was set to 34(° C.). However, these standard values do not invariably need to be set to these values and can be appropriately changed in accordance with the design specifications and the installation environment. For example, the standard value Sv1 may also be set to 1(° C.) or may also be set to 3 (° C.). Furthermore, for example, the standard value Sv2 may also be set to 42(° C.) or may also be set to 48 (° C.). Furthermore, for example, the standard value Sv3 may also be set to 16(° C.) or may also be set to 20(° C.). Furthermore, for example, the standard value Sv4 may also be set to 32(° C.) or may also be set to 36 (° C.).

(7-9) Example Modification I

In the above embodiment, the predetermined amount of time t1 was set to 720 hours (i.e., 30 days). However, the predetermined amount of time t1 does not invariably need to be set to this value and can be appropriately changed. For example, the predetermined amount of time t1 may also be set to 336 hours (i.e., 14 days) or may also be set to 2,160 hours (i.e., 90 days).

Furthermore, the predetermined amount of time t2 was set to 3 minutes, but the predetermined amount of time t2 can be appropriately changed in accordance with the design specifications and the installation environment. For example, the predetermined amount of time t2 may also be set to 1.5 minutes or may also be set to 10 minutes.

(7-10) Example Modification J

In the above embodiment, in a case where the outdoor air temperature To and the indoor temperature Ti met a predetermined condition, the air conditioning system 100 transitioned to the refrigerant quantity determination mode, and in a case where the outdoor air temperature To and the indoor temperature Ti did not meet a predetermined condition, the air conditioning system 100 switched to a standby state. However, in a case where the outdoor air temperature To and the indoor temperature Ti do not meet the predetermined condition, the air conditioning system 100 may also be configured to perform a preliminary operation such as the heating operation for a predetermined amount of time and then transition to the refrigerant quantity determination mode without switching to the standby state.

(7-11) Example Modification K

In the above embodiment, the determination value Dv1 was calculated as a value obtained by dividing the second refrigerant flow rate Fr2 by the first refrigerant flow rate Fr1. However, the determination value Dv1 may also be calculated as a difference value obtained by subtracting the first refrigerant flow rate Fr1 from the second refrigerant flow rate Fr2. In this case, as regards the first threshold value ΔTh1, it suffices for a suitable value to be appropriately selected.

(7-12) Example Modification L

In the above embodiment, the first threshold value ΔTh1 was set equal to 5, but the first threshold value ΔTh1 is not invariably limited to this value and can be appropriately changed in accordance with the design specifications and the installation environment. For example, the first threshold value ΔTh1 may also be set equal to 4 or set equal to 6.

(7-13) Example Modification M

In the above embodiment, the first refrigerant flow rate Fr1 was calculated in line with formula F1 defined on the basis of refrigeration cycle theory, and the second refrigerant flow rate Fr2 was calculated in line with F2 defined on the basis of fluid theory. However, formula F1 and formula F2 are examples and are not invariably limited to the same aspects as in the above embodiment. That is, formula F1 can be appropriately changed so long as it is defined on the basis of refrigeration cycle theory. Furthermore, formula F2 can be appropriately changed so long as it is defined on the basis of fluid theory.

(7-14) Example Modification N

In the above embodiment, the bypass circuit RC2 was configured as a circuit that causes the refrigerant to bypass from the high-pressure side to the low-pressure side of the refrigerant primary circuit RC1. However, the bypass circuit RC2 is not invariably limited to this and may also be configured as a circuit that causes the refrigerant to bypass from the high-pressure side to the intermediate-pressure side of the refrigerant primary circuit RC1. For example, the bypass circuit RC2 may also be configured as an intermediate injection circuit that extends from the branching portion BP and is connected to the compressor 11.

(7-15) Example Modification O

In the above embodiment, the branching portion BP was disposed between the first outdoor expansion valve 14 and the subcooling heat exchanger 16 (i.e., on the sixth pipe P6). However, the position where the branching portion BP is disposed is not particularly limited to this and can be appropriately changed. For example, the branching portion BP may also be disposed between the first outdoor expansion valve 14 and the outdoor heat exchanger 13 (i.e., on the fifth pipe P5). Furthermore, for example, the branching portion BP may also be disposed between the subcooling heat exchanger 16 and the liquid-side stop valve 18 (i.e., on the seventh pipe P7).

(7-16) Example Modification P

In the above embodiment, the joining portion JP was disposed between the gas-side stop valve 17 and the four-way switching valve 12 (i.e., on the first pipe P1). However, the position where the joining portion JP is disposed is not particularly limited to this and can be appropriately changed. For example, the joining portion JP may also be disposed between the four-way switching valve 12 and the compressor 11 (i.e., on the second pipe P2).

(7-17) Example Modification Q

In the above embodiment, in the refrigerant quantity determination mode (the refrigerant quantity determination operation), the operating states of the actuators were controlled so as to become fixed. However, in the refrigerant quantity determination mode, the actuators do not invariably need to have their operating states fixed and may also have their operating states variably controlled so long as it is an extent that does not interfere with the calculation of the first refrigerant flow rate Fr1 and the second refrigerant flow rate Fr2.

(7-18) Example Modification R

In the above embodiment, R32 was used as the refrigerant circulating in the refrigerant circuit RC. However, the refrigerant used in the refrigerant circuit RC is not particularly limited. For example, HFO1234yf, HFO1234ze(E), or a mixed refrigerant comprising these refrigerants may also be used instead of R32 in the refrigerant circuit RC. Furthermore, an HFC refrigerant such as R407C or R410A may also be used in the refrigerant circuit RC.

(7-19) Example Modification S

In the above embodiment, the controller 50 was configured as a result of the outdoor unit control component 26 and the indoor unit control component 35 being interconnected by a communication line. However, it is not invariably necessary for part or all of the controller 50 to be disposed in either the outdoor unit 10 or the indoor unit 30, and part or all of the controller 50 may also be disposed in a remote location connected via a network such as a LAN or a WAN.

INDUSTRIAL APPLICABILITY

The present invention is applicable to a refrigeration apparatus.

What is claimed is:

1. A refrigeration apparatus comprising:
a refrigerant primary circuit including a compressor, a refrigerant radiator, a refrigerant evaporator, and a first expansion valve;
a bypass circuit extending between a branching portion disposed on the refrigerant primary circuit and a joining portion disposed on the refrigerant primary circuit, the bypass circuit being configured and arranged to cause refrigerant to bypass;
a heat exchanger including a first refrigerant flow path disposed on the refrigerant primary circuit and a second refrigerant flow path disposed on the bypass circuit, the heat exchanger causing the refrigerant flowing through the first refrigerant flow path and the refrigerant flowing through the second refrigerant flow path to exchange heat;
a second expansion valve disposed on an upstream side of the heat exchanger in the bypass circuit, the second expansion valve being configured and arranged to reduce the pressure of the refrigerant;
a first refrigerant flow rate calculating component configured and arranged to calculate, as a first refrigerant flow rate based on refrigeration cycle theory, a first refrigerant flow rate of the refrigerant flowing through the bypass circuit;
a second refrigerant flow rate calculating component configured and arranged to calculate, as a second refrigerant flow rate based on fluid theory, a second refrigerant flow rate of the refrigerant flowing through the bypass circuit; and
a determining component configured and arranged to determine whether or not there is refrigerant leakage or refrigerant charge deficiency based on a result of a comparison of the first refrigerant flow rate calculated by the first refrigerant flow rate calculating component and the second refrigerant flow rate calculated by the second refrigerant flow rate calculating component.

2. The refrigeration apparatus according to claim 1, further comprising:
a first sensor disposed on an upstream side of the branching portion, the first sensor being used to measure an enthalpy of the refrigerant flowing into the branching portion,
a second sensor disposed on a downstream side of the first refrigerant flow path, the second sensor being used to measure an enthalpy of the refrigerant flowing out from the first refrigerant flow path, and
a third sensor disposed on a downstream side of the second refrigerant flow path, the third sensor being used to measure an enthalpy of the refrigerant flowing out from the second refrigerant flow path.

3. The refrigeration apparatus according to claim 2, wherein
the first refrigerant flow rate calculating component is configured and arranged to calculate the first refrigerant flow rate based on a measurement value of the first sensor, a measurement value of the second sensor, a measurement value of the third sensor, and a refrigerant circulation quantity.

4. The refrigeration apparatus according to claim 3, further comprising:
a fourth sensor disposed on an upstream side of the branching portion, the fourth sensor being used to measure a corresponding saturated pressure of the refrigerant flowing into the branching portion; and
a fifth sensor disposed on a suction side of the compressor, the fifth sensor being used to measure a refrigerant pressure on the suction side of the compressor.

5. The refrigeration apparatus according to claim 3, wherein
the first sensor is a temperature sensor configured and arranged to detect a temperature of the refrigerant flowing into the branching portion,
the second sensor is a temperature sensor configured and arranged to detect a temperature of the refrigerant flowing out from the first refrigerant flow path, and
the third sensor is a temperature sensor configured and arranged to detect a temperature of the refrigerant flowing out from the second refrigerant flow path.

6. The refrigeration apparatus according to claim 2, wherein
the first sensor is a temperature sensor configured and arranged to detect a temperature of the refrigerant flowing into the branching portion,
the second sensor is a temperature sensor configured and arranged to detect a temperature of the refrigerant flowing out from the first refrigerant flow path, and
the third sensor is a temperature sensor configured and arranged to detect a temperature of the refrigerant flowing out from the second refrigerant flow path.

7. The refrigeration apparatus according to claim 2, further comprising:
a fourth sensor disposed on an upstream side of the branching portion, the fourth sensor being used to measure a corresponding saturated pressure of the refrigerant flowing into the branching portion; and
a fifth sensor disposed on a suction side of the compressor, the fifth sensor being used to measure a refrigerant pressure on the suction side of the compressor.

8. The refrigeration apparatus according to claim 2, wherein
the determining component is configured and arranged to determine whether or not there is refrigerant leakage or refrigerant charge deficiency based a result of a comparison of
a value obtained by dividing the second refrigerant flow rate by the first refrigerant flow rate and
a predetermined first threshold value.

9. The refrigeration apparatus according to claim 2, further comprising:
a control component configured and arranged to control operations of the compressor, the expansion valve, and the second expansion valve,
the control component being configured and arranged to fix operating states of the compressor, the expansion valve, and the second expansion valve when the first refrigerant flow rate calculating component and the second refrigerant flow rate calculating component calculate the refrigerant flow rates.

10. The refrigeration apparatus according to claim 2, wherein
the determining component is configured and arranged to determine whether or not there is refrigerant leakage or refrigerant charge deficiency in a case where an outside air temperature and an indoor temperature meet a predetermined temperature condition.

11. The refrigeration apparatus according to claim 1, further comprising:
a fourth sensor disposed on an upstream side of the branching portion, the fourth sensor being used to measure a corresponding saturated pressure of the refrigerant flowing into the branching portion; and
a fifth sensor disposed on a suction side of the compressor, the fifth sensor being used to measure a refrigerant pressure on the suction side of the compressor.

12. The refrigeration apparatus according to claim 11, wherein
the second refrigerant flow rate calculating component is configured and arranged to calculate the second refrigerant flow rate based on a measurement value of the fourth sensor, a measurement value of the fifth sensor, an opening degree of the second expansion valve, and a corresponding saturated liquid density of the refrigerant flowing into the branching portion.

13. The refrigeration apparatus according to claim 11, wherein
the determining component is configured and arranged to determine whether or not there is refrigerant leakage or refrigerant charge deficiency based a result of a comparison of
a value obtained by dividing the second refrigerant flow rate by the first refrigerant flow rate and
a predetermined first threshold value.

14. The refrigeration apparatus according to claim 11, further comprising:
a control component configured and arranged to control operations of the compressor, the expansion valve, and the second expansion valve,
the control component being configured and arranged to fix operating states of the compressor, the expansion valve, and the second expansion valve when the first refrigerant flow rate calculating component and the second refrigerant flow rate calculating component calculate the refrigerant flow rates.

15. The refrigeration apparatus according to claim 11, wherein
the determining component is configured and arranged to determine whether or not there is refrigerant leakage or refrigerant charge deficiency in a case where an outside air temperature and an indoor temperature meet a predetermined temperature condition.

16. The refrigeration apparatus according to claim 1, wherein
the determining component is configured and arranged to determine whether or not there is refrigerant leakage or refrigerant charge deficiency based a result of a comparison of
a value obtained by dividing the second refrigerant flow rate by the first refrigerant flow rate and
a predetermined first threshold value.

17. The refrigeration apparatus according to claim 16, further comprising:
a control component configured and arranged to control operations of the compressor, the expansion valve, and the second expansion valve,
the control component being configured and arranged to fix operating states of the compressor, the expansion valve, and the second expansion valve when the first refrigerant flow rate calculating component and the second refrigerant flow rate calculating component calculate the refrigerant flow rates.

18. The refrigeration apparatus according to claim 16, wherein the determining component is configured and arranged to determine whether or not there is refrigerant leakage or refrigerant charge deficiency in a case where an outside air temperature and an indoor temperature meet a predetermined temperature condition.

19. The refrigeration apparatus according to claim 1, further comprising:
a control component configured and arranged to control operations of the compressor, the expansion valve, and the second expansion valve,
the control component being configured and arranged to fix operating states of the compressor, the expansion valve, and the second expansion valve when the first refrigerant flow rate calculating component and the second refrigerant flow rate calculating component calculate the refrigerant flow rates.

20. The refrigeration apparatus according to claim 1, wherein
the determining component is configured and arranged to determine whether or not there is refrigerant leakage or refrigerant charge deficiency in a case where an outside air temperature and an indoor temperature meet a predetermined temperature condition.

* * * * *